US012600498B1

(12) United States Patent
Fleming et al.

(10) Patent No.: US 12,600,498 B1
(45) Date of Patent: Apr. 14, 2026

(54) MULTI-AGENT SPACECRAFT SYSTEM FOR RENDEZVOUS AND PROXIMITY OPERATIONS

(71) Applicant: iMETALX, INC., Sausalito, CA (US)

(72) Inventors: Alexander Jacques Fleming, San Francisco, CA (US); Nehal Gajjar, San Francisco, CA (US); Michael Anthony Hernandez, Sausalito, CA (US); Owen Joseph Leather, San Rafael, CA (US)

(73) Assignee: IMETALX, INC., Sausalito, CA (US)

( * ) Notice: Subject to any disclaimer, the term of this patent is extended or adjusted under 35 U.S.C. 154(b) by 12 days.

(21) Appl. No.: 19/041,339

(22) Filed: Jan. 30, 2025

Related U.S. Application Data

(60) Provisional application No. 63/626,852, filed on Jan. 30, 2024.

(51) Int. Cl.
B64G 1/24 (2006.01)
B64G 1/10 (2006.01)

(52) U.S. Cl.
CPC ........... B64G 1/242 (2013.01); B64G 1/1085 (2013.01)

(58) Field of Classification Search
CPC .............................. B64G 1/242; B64G 1/1085
See application file for complete search history.

(56) References Cited

U.S. PATENT DOCUMENTS 10,882,644 B1 * 1/2021 Schwarz .................. B64G 1/32
2024/0425206 A1 * 12/2024 Hui ...................... B64G 1/2427

* cited by examiner

*Primary Examiner* — Tye William Abell

(57) ABSTRACT

Various embodiments comprise a multi-agent spacecraft system for rendezvous and proximity operations. The spacecraft system comprises a chief spacecraft and a deputy spacecraft. The chief spacecraft maneuvers to the orbit of a Resident Space Object (RSO) and deploys a deputy spacecraft to rendezvous with the RSO. The deputy spacecraft maneuvers to the RSO and senses the RSO during the rendezvous and proximity operations maneuver. The deputy spacecraft generates a Three-Dimensional (3D) surface reconstruction of the RSO based on the sensing. The deputy spacecraft determines a roll rate and a relative trajectory of the RSO based on the sensing. The deputy spacecraft returns to the chief spacecraft.

20 Claims, 18 Drawing Sheets

100

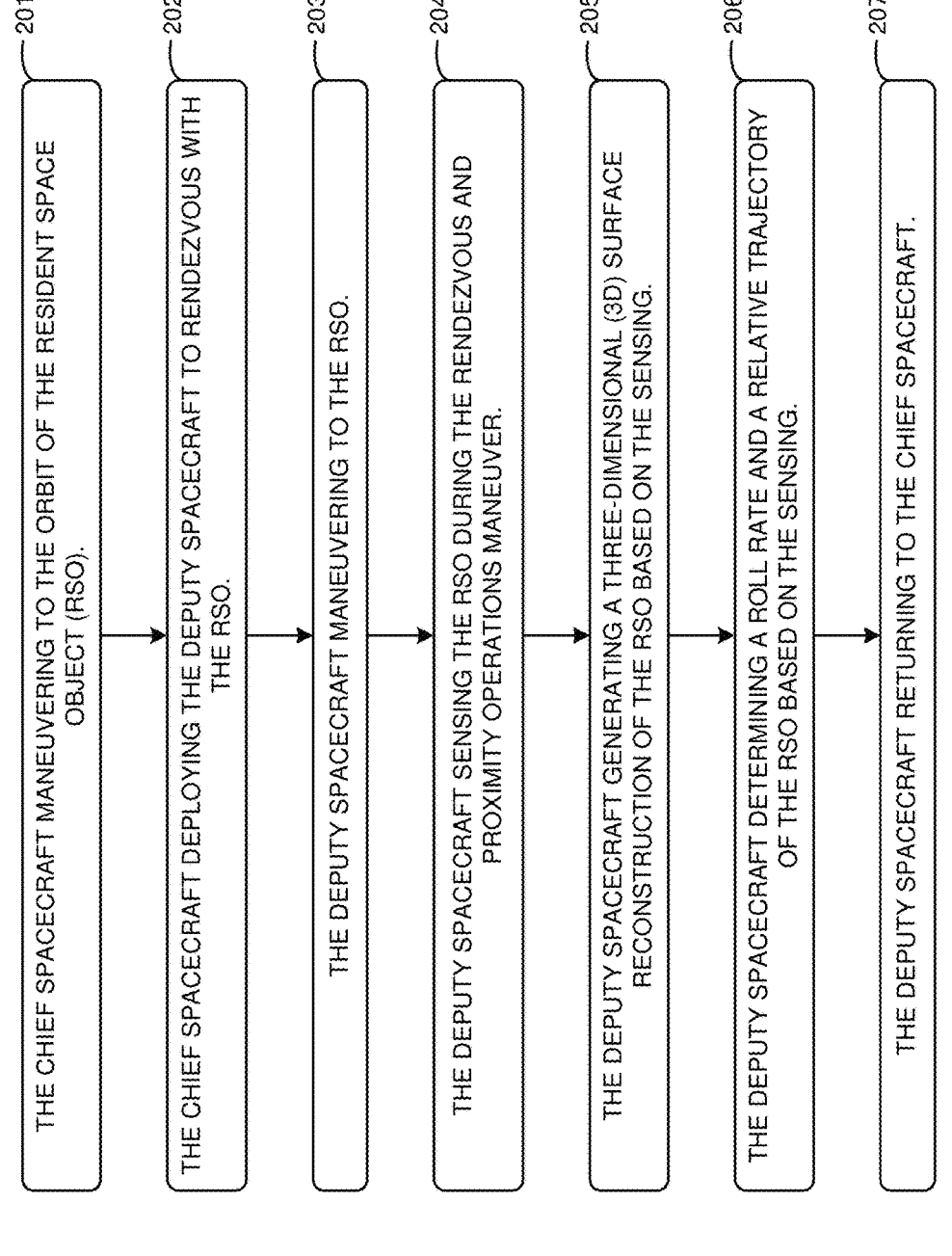

THE CHIEF SPACECRAFT MANEUVERING TO THE ORBIT OF THE RESIDENT SPACE OBJECT (RSO). 201

THE CHIEF SPACECRAFT DEPLOYING THE DEPUTY SPACECRAFT TO RENDEZVOUS WITH THE RSO. 202

THE DEPUTY SPACECRAFT MANEUVERING TO THE RSO. 203

THE DEPUTY SPACECRAFT SENSING THE RSO DURING THE RENDEZVOUS AND PROXIMITY OPERATIONS MANEUVER. 204

THE DEPUTY SPACECRAFT GENERATING A THREE-DIMENSIONAL (3D) SURFACE RECONSTRUCTION OF THE RSO BASED ON THE SENSING. 205

THE DEPUTY SPACECRAFT DETERMINING A ROLL RATE AND A RELATIVE TRAJECTORY OF THE RSO BASED ON THE SENSING. 206

THE DEPUTY SPACECRAFT RETURNING TO THE CHIEF SPACECRAFT. 207

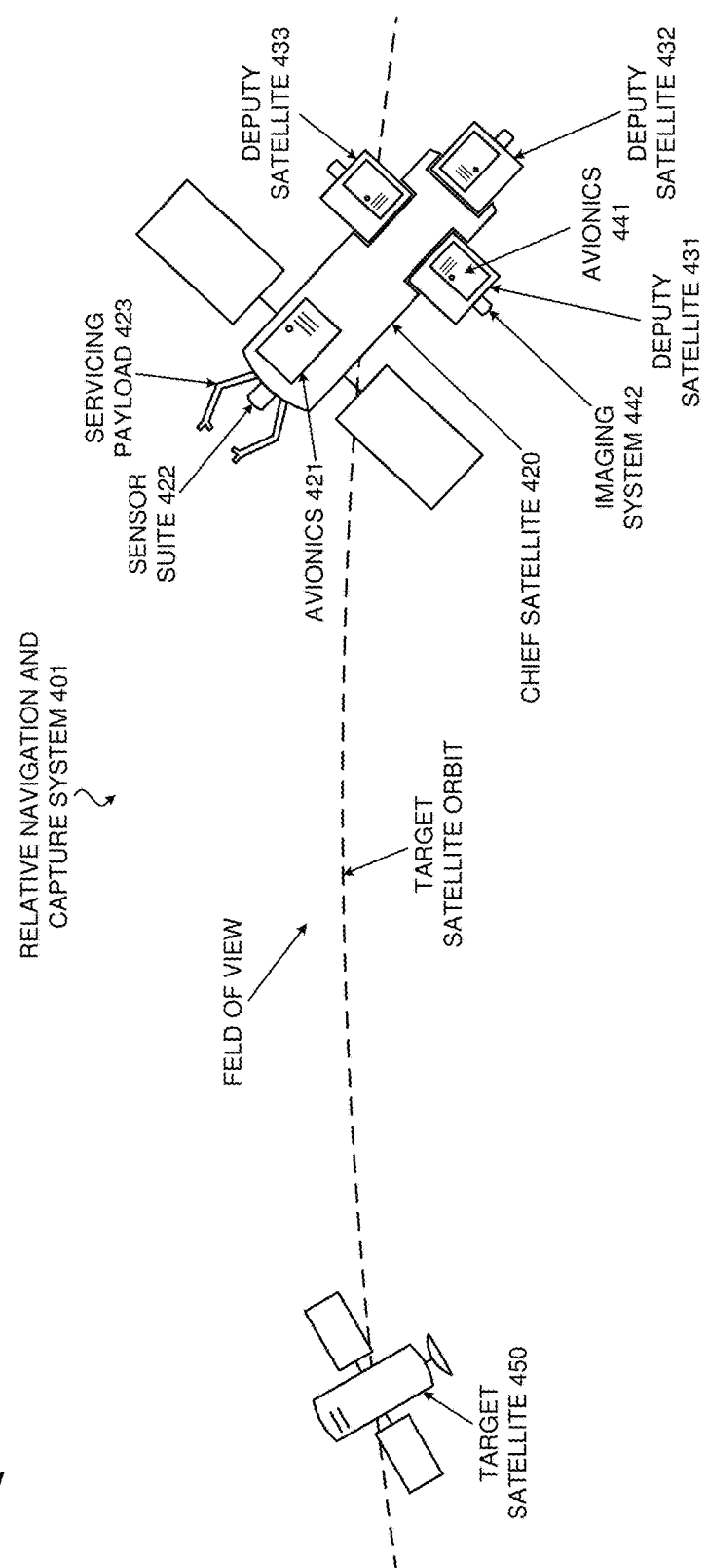
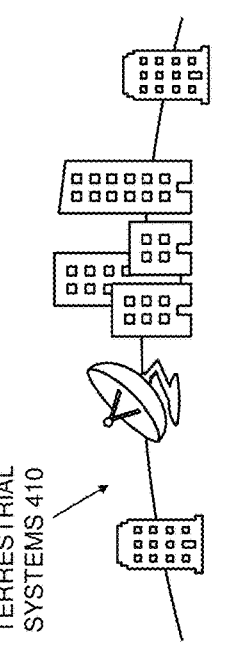
FIGURE 4

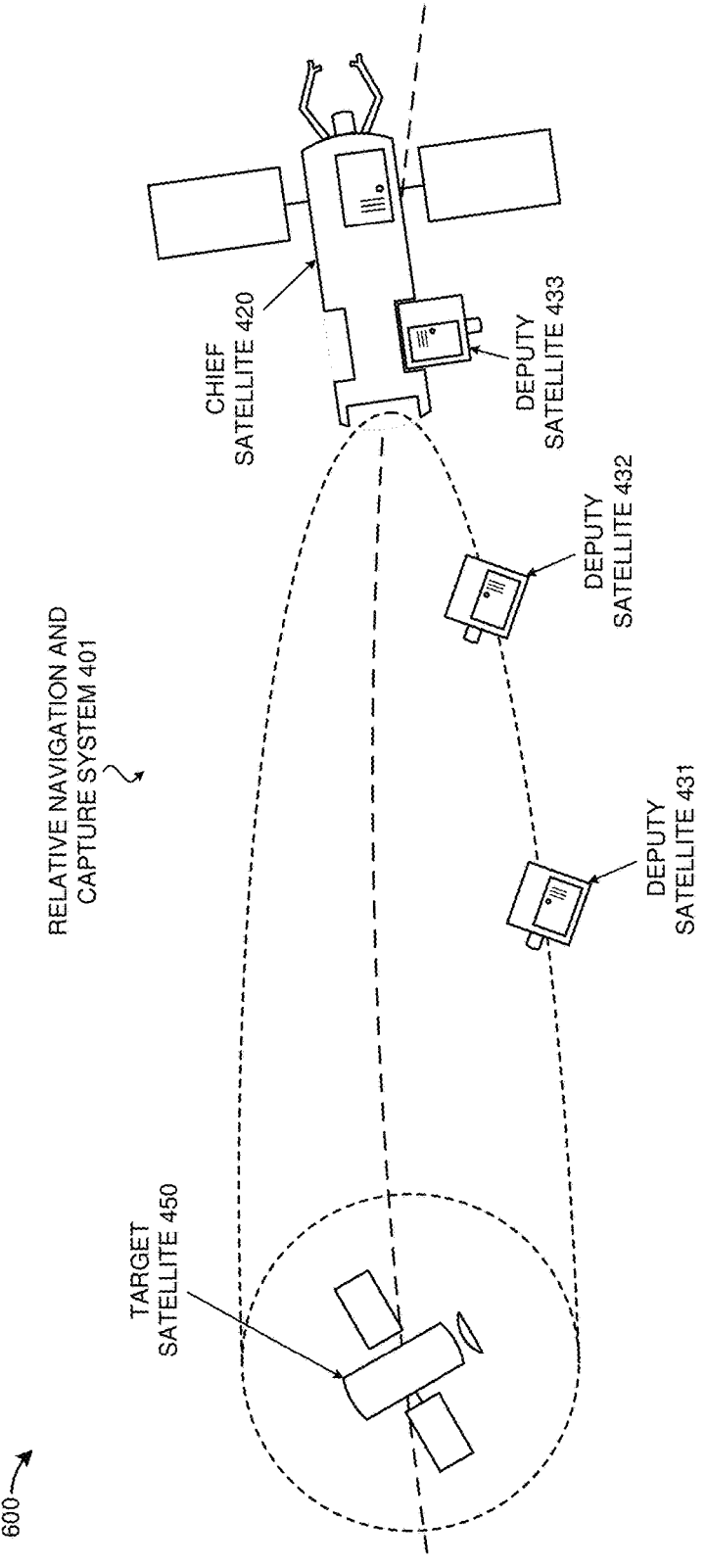
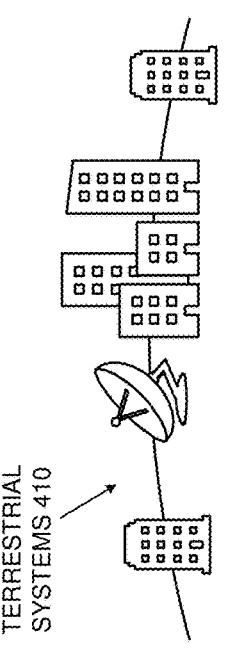
FIGURE 6

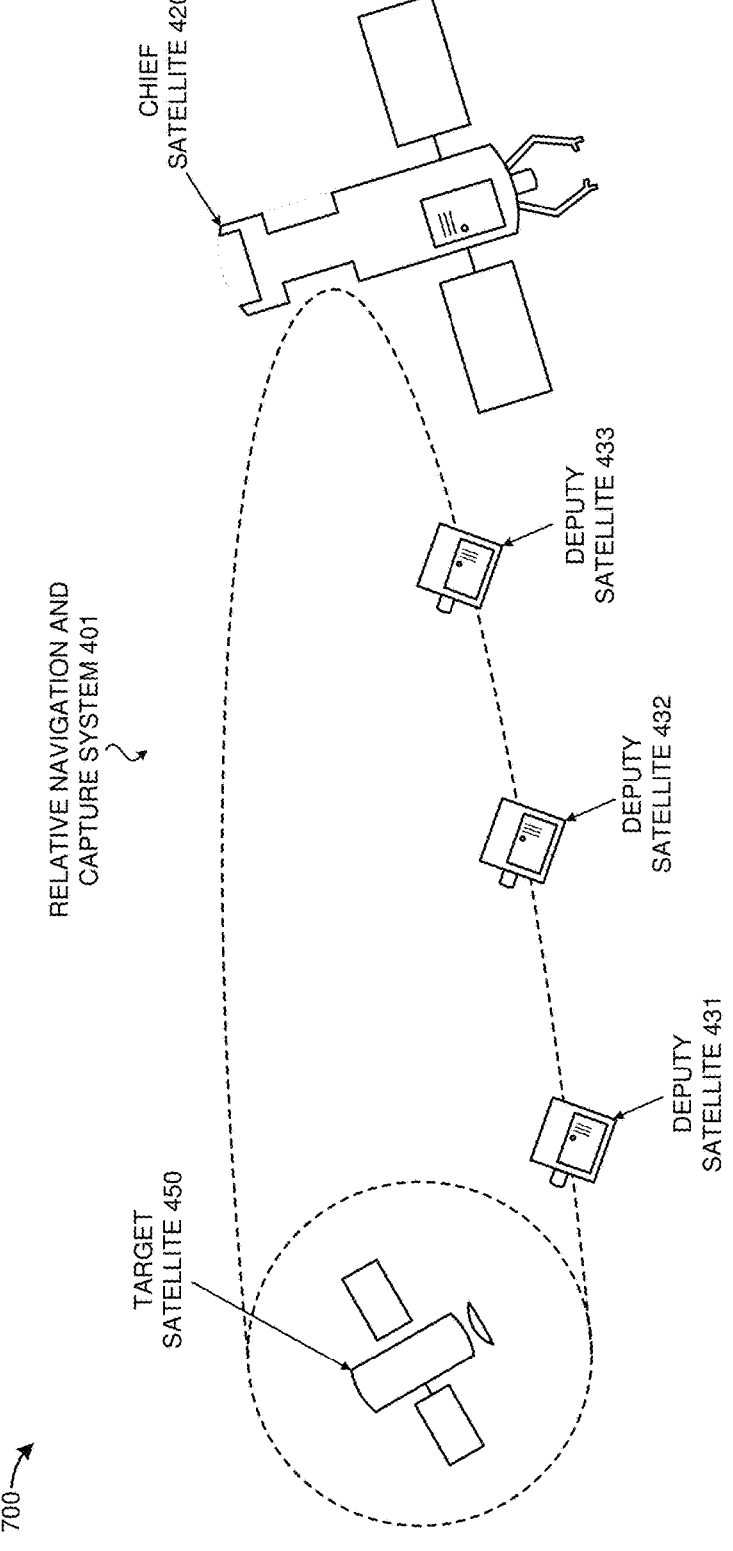
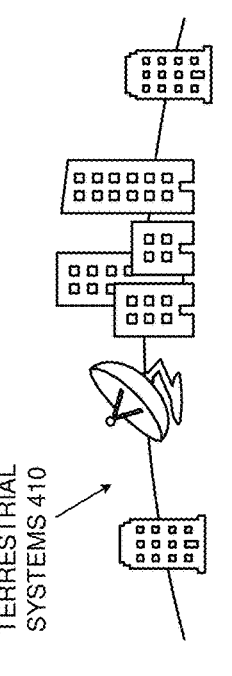
FIGURE 7

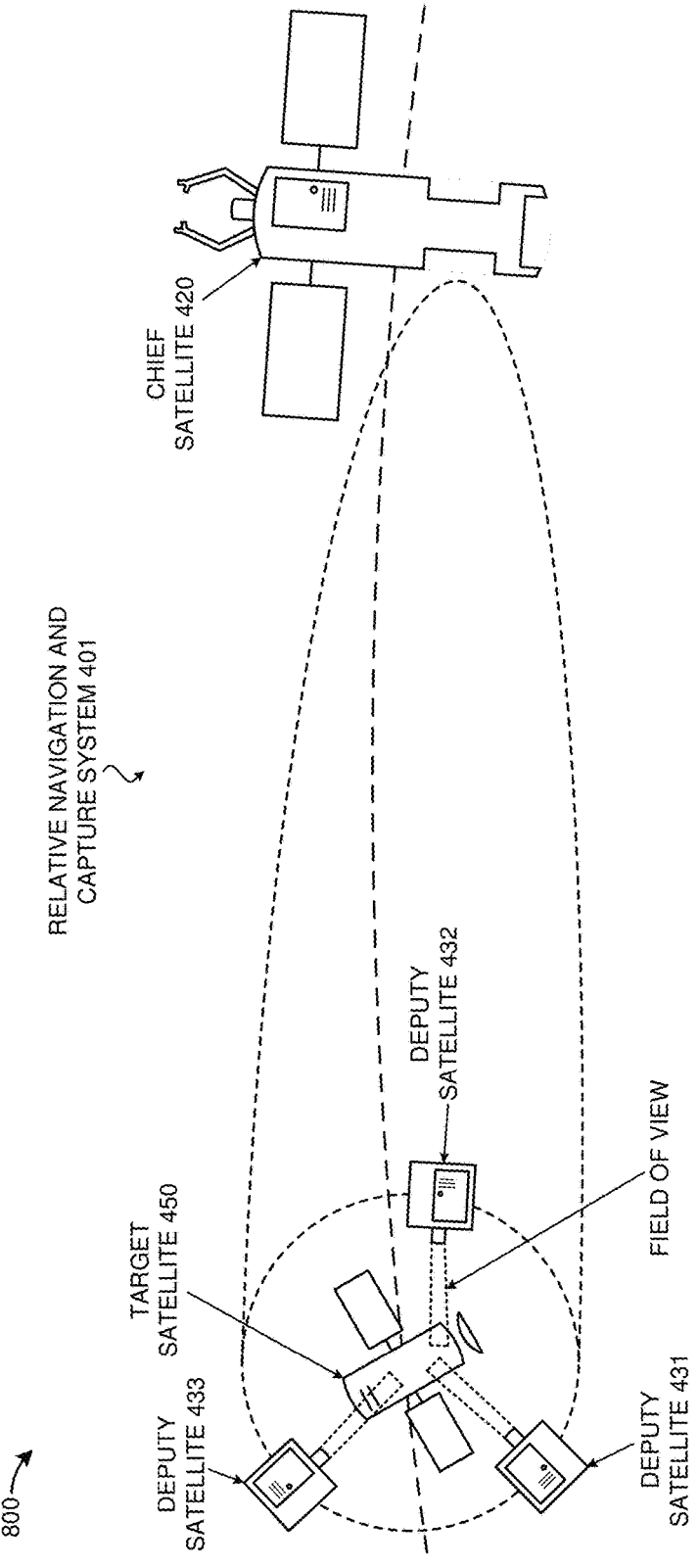
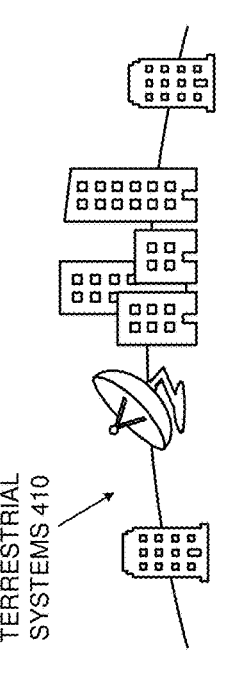
FIGURE 8

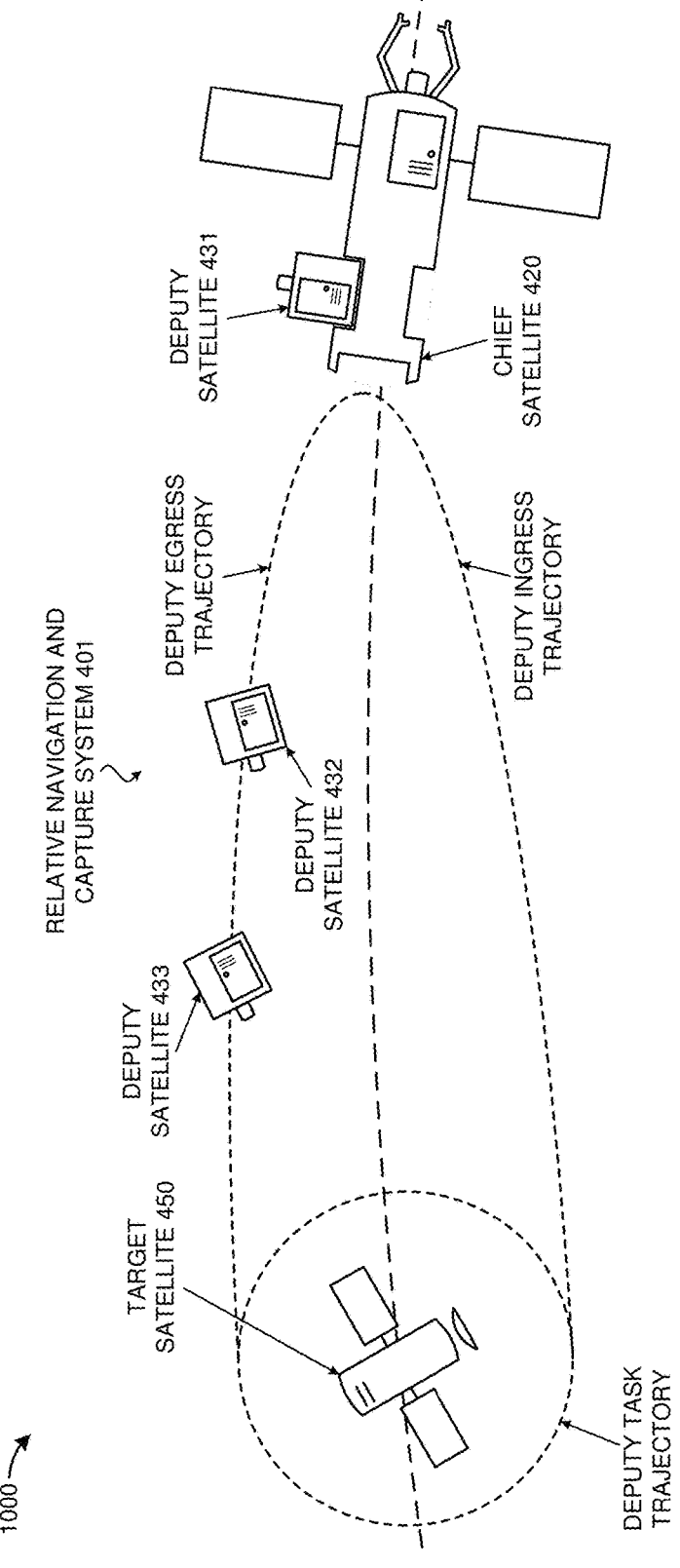
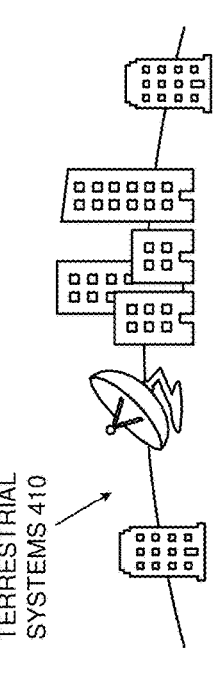
FIGURE 9

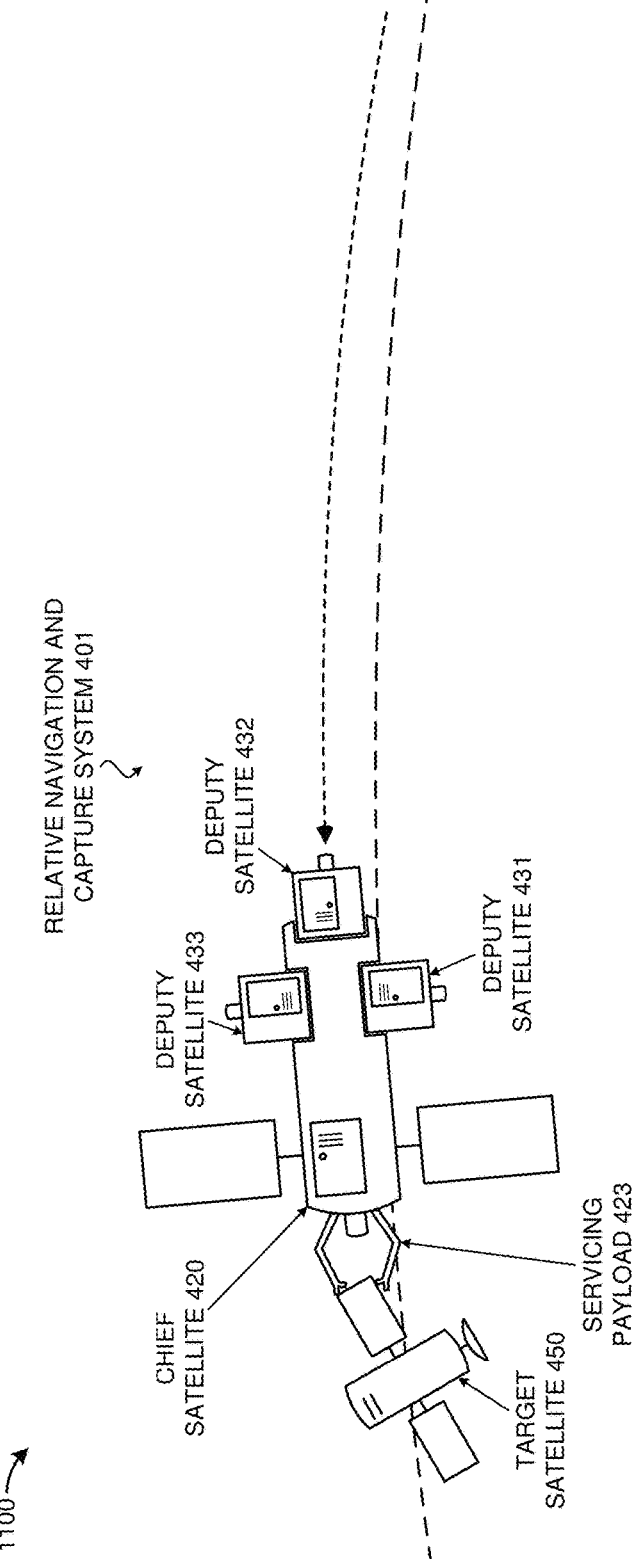
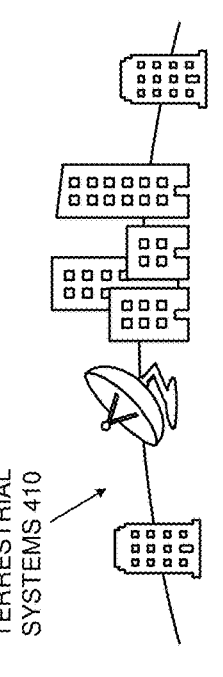
FIGURE 10

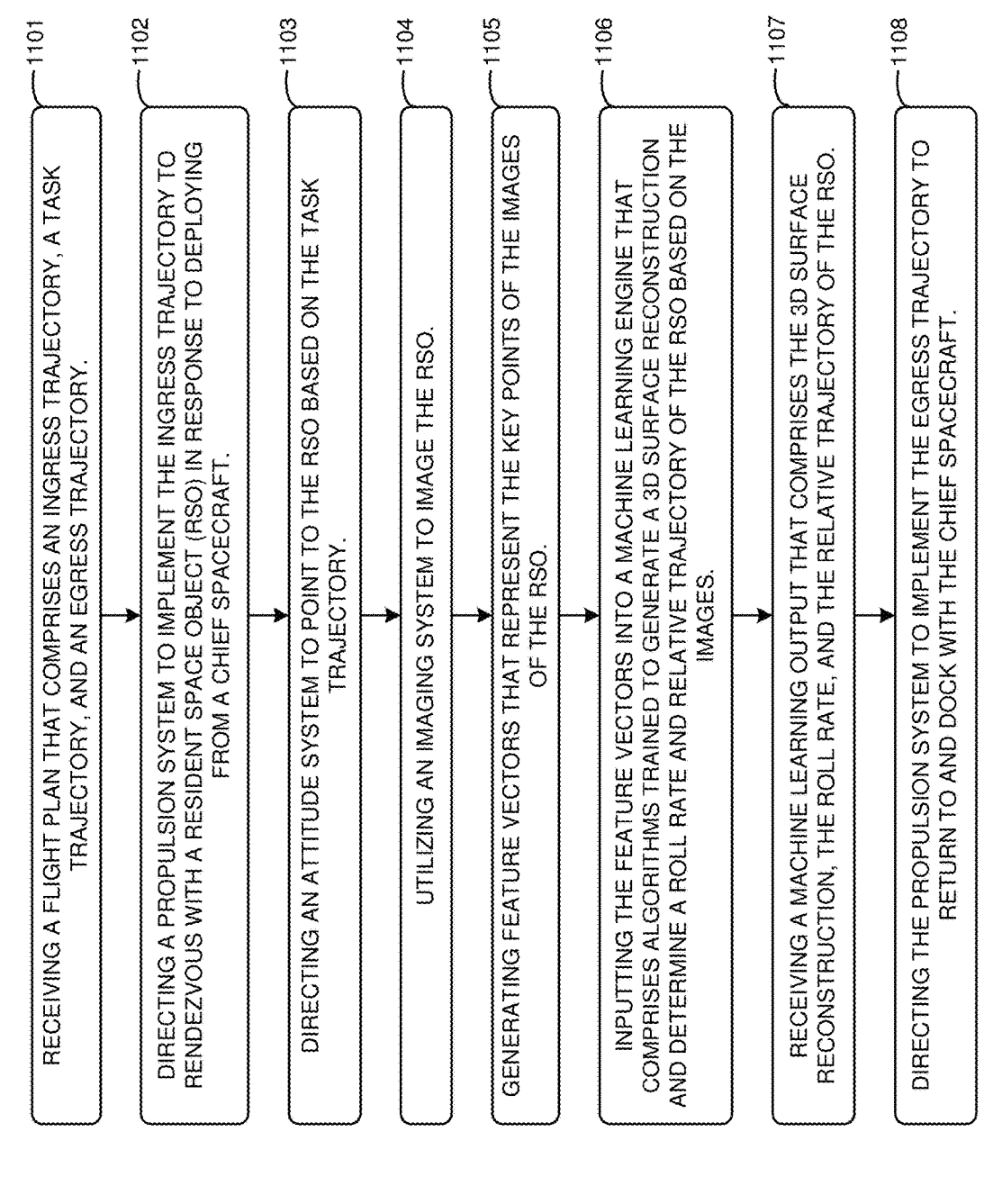

1100

1101 — RECEIVING A FLIGHT PLAN THAT COMPRISES AN INGRESS TRAJECTORY, A TASK TRAJECTORY, AND AN EGRESS TRAJECTORY.

1102 — DIRECTING A PROPULSION SYSTEM TO IMPLEMENT THE INGRESS TRAJECTORY TO RENDEZVOUS WITH A RESIDENT SPACE OBJECT (RSO) IN RESPONSE TO DEPLOYING FROM A CHIEF SPACECRAFT.

1103 — DIRECTING AN ATTITUDE SYSTEM TO POINT TO THE RSO BASED ON THE TASK TRAJECTORY.

1104 — UTILIZING AN IMAGING SYSTEM TO IMAGE THE RSO.

1105 — GENERATING FEATURE VECTORS THAT REPRESENT THE KEY POINTS OF THE IMAGES OF THE RSO.

1106 — INPUTTING THE FEATURE VECTORS INTO A MACHINE LEARNING ENGINE THAT COMPRISES ALGORITHMS TRAINED TO GENERATE A 3D SURFACE RECONSTRUCTION AND DETERMINE A ROLL RATE AND RELATIVE TRAJECTORY OF THE RSO BASED ON THE IMAGES.

1107 — RECEIVING A MACHINE LEARNING OUTPUT THAT COMPRISES THE 3D SURFACE RECONSTRUCTION, THE ROLL RATE, AND THE RELATIVE TRAJECTORY OF THE RSO.

1108 — DIRECTING THE PROPULSION SYSTEM TO IMPLEMENT THE EGRESS TRAJECTORY TO RETURN TO AND DOCK WITH THE CHIEF SPACECRAFT.

MULTI-AGENT SPACECRAFT SYSTEM FOR RENDEZVOUS AND PROXIMITY OPERATIONS

RELATED APPLICATIONS

This U.S. Patent application claims the benefit of and priority to U.S. Provisional Patent Application 63/626,852 titled, "MULTI-AGENT SPACECRAFT SYSTEM FOR RENDEZVOUS AND PROXIMITY OPERATIONS" which was filed on Jan. 30, 2024, and which is hereby incorporated by reference in its entirety into this U.S. Patent Application.

STATEMENT REGARDING FEDERALLY FUNDED RESEARCH

This invention was made with Government support under contract FA864923P0837 awarded by The Air Force Research Laboratory (AFRL) of the Department of Defense (DOD). The Government has certain rights in the invention.

TECHNICAL FIELD

Various embodiments of the present technology relate to aerospace systems, and more specifically, to multi-agent spacecraft systems that utilize relative navigation for rendezvous and proximity operations.

BACKGROUND

A multi-agent spacecraft system comprises a group of spacecraft configured to perform one or more services. Exemplary service types include providing global positioning services, Earth observation, and space-based internet. The spacecraft are typically organized to fly as a constellation in orbit around Earth. In the constellation, the spacecraft are spatially disparate from one another, and their relative positions are static. For example, a spacecraft constellation that provides global positioning services may fly the satellites in medium-earth orbit along multiple orbital inclinations where the satellites orbiting on the same inclination are spaced at intervals of 30,000 kilometers. Given the vast distances and relative static positioning between the spacecraft of conventional multi-agent spacecraft systems, the chances of collision or physical interaction between the satellites is negligible.

Rendezvous and proximity operations are a class of spacecraft operation characterized by maneuvers that place two or more spacecraft on the same or similar orbit at close distance, typically within visual range. Exemplary rendezvous operations include space station resupply operations and in-space servicing operations. Typical autonomous rendezvous operations involve simplistic operations where a single autonomous vehicle maneuvers to and rendezvous with a target object whose trajectory and rotation are known and/or controlled, and communication is readily exchanged between both vehicles commonly known as cooperative operations. Using multiple autonomous vehicles to perform rendezvous and proximity operations is difficult. The difficulty is compounded when the target object's trajectory and rotation are unknown or uncontrolled, known as uncooperative operations. The autonomous spacecraft may collide with each other and the target object. When small autonomous spacecraft are used, they may lack the capabilities (e.g., less powerful) of larger spacecraft further compounding the difficulty. Unfortunately, conventional multi-agent spacecraft systems do not efficiently or effectively perform rendezvous and proximity operations. Moreover, the control and organization methods used to form conventional spatially disparate multi-agent spacecraft systems are not readily applicable to autonomous multi-agent rendezvous and proximity operations.

Spacecraft are vehicles with various constraints given the harshness of the environment, and nature of the mission type. Since spacecraft are unable to be touched, augmented, or otherwise adjusted post-launch, the resources and operations of these vehicles typically need to be self-contained. As a result of these limitations, the power generation capabilities of these systems along with the harsh radiation environment result in computing constraints that inhibit state-of-the-art processors and compute platforms from being levied for space-based applications. As such, terrestrial artificial intelligence and machine learning implementations have not been effectively integrated into space-based operations given the constrained and harsh operating environment.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to space-based rendezvous and proximity operations like relative navigation and Three-Dimensional (3D) surface model reconstruction of Resident Space Object (RSOs). Some embodiments comprise a multi-agent spacecraft system for rendezvous and proximity operations. The multi-agent spacecraft system comprises a chief spacecraft and a deputy spacecraft. The chief spacecraft maneuvers to the orbit of an RSO and deploys a deputy spacecraft to rendezvous with the RSO. The deputy spacecraft maneuvers to the RSO and senses the RSO during the rendezvous and proximity operations maneuver. The deputy spacecraft generates a 3D surface reconstruction of the RSO, determines a roll rate, and determines a relative trajectory of the RSO based on the sensing. The deputy spacecraft returns to the chief spacecraft.

Some embodiments comprise a method of operating a multi-agent spacecraft system for rendezvous and proximity operations. The method comprises a chief spacecraft maneuvering to the orbit of an RSO. The method further comprises the chief spacecraft deploying a deputy spacecraft to rendezvous with the RSO. The method further comprises the deputy spacecraft maneuvering to the RSO. The method further comprises the deputy spacecraft sensing the RSO during the rendezvous and proximity operations maneuver. The method further comprises the deputy spacecraft generating a 3D surface reconstruction of the RSO based on the sensing. The method further comprises the deputy spacecraft determining a roll rate and a relative trajectory of the RSO based on the sensing. The method further comprises the deputy spacecraft returning to the chief spacecraft.

Some embodiments comprise one or more non-transitory computer-readable storage media. The storage media stores program instructions to operate a deputy spacecraft for rendezvous and proximity operations. When executed by a computing system, the program instructions direct the computing system to perform operations. The operations comprise receiving a flight plan that comprises an ingress trajectory, a task trajectory, and an egress trajectory. In response to deploying from a chief spacecraft, the operations further comprise directing a propulsion system to implement the ingress trajectory to rendezvous with an RSO. The operations further comprise directing an attitude system to point to the RSO based on the task trajectory. The operations further comprise utilizing an imaging system to image the RSO. The operations further comprise generating feature vectors that represent the images of the RSO. The operations further comprise inputting the feature vectors into a machine learning engine that comprises algorithms trained to generate a 3D surface reconstruction and determine a roll rate and a relative trajectory of the RSO based on the images. The operations further comprise receiving a machine learning output that comprises the 3D surface reconstruction, the roll rate, and the relative trajectory of the RSO. The operations further comprise directing the propulsion system to implement the egress trajectory to return to the chief spacecraft wherein the deputy spacecraft docks with the chief spacecraft upon its return.

Some embodiments of the multi-agent system comprise the usage of a partnered vehicle in close proximity that can be used as a distributed edge compute resource. The operations comprise utilizing this nearby vehicle to enable parallel processing on GPU clusters without limiting the Size, Weight, and Power (SWAP) requirements of the primary vehicle. This expanded compute capacity prevents a mission Concept of Operation (ConOp) from having a single point of failure or vulnerability in areas of conflict or contention. The operations further comprise utilizing edge processing of payload data on this secondary vehicle to augment existing multi-domain assets for command, control, sensor saturation, or downlink and bandwidth limitations.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the multi-agent spacecraft system.

FIG. 4 illustrates a multi-agent spacecraft system.

FIG. 6 further illustrates the multi-agent spacecraft system.

FIG. 7 further illustrates the multi-agent spacecraft system.

FIG. 8 further illustrates the multi-agent spacecraft system.

FIG. 9 further illustrates the multi-agent spacecraft system.

FIG. 10 further illustrates the multi-agent spacecraft system.

FIG. 11 illustrates an exemplary operation of the multi-agent spacecraft system.

TECHNICAL DESCRIPTION

Figure 1:
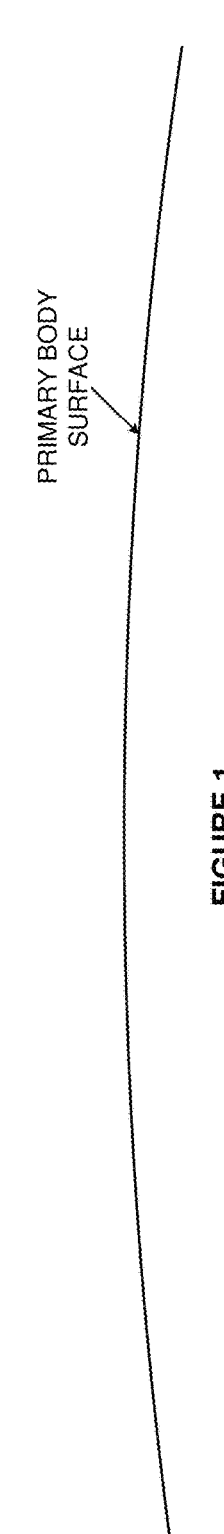
FIG. 1 illustrates an exemplary multi-agent spacecraft system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The examples herein present systems and methods of operating a multi-agent spacecraft system with applications in RSO rendezvous, surveying, inspection, property identification, deorbiting, servicing, capture, and monitoring. Conventional systems to coordinate the operation and movement of multi-agent spacecraft are directed to large spacecraft systems spread out over vast distances (e.g., satellite constellations). In these systems, the formation flight is primarily concerned with forming a large, sparse, and static network. The methods to control and form these systems are not readily applicable to spatially proximate (e.g., between 10-50 km) and mobile multi-agent spacecraft systems. Conventional methods are inadequate to solve the problem of forming a smaller and dynamic network around a client body for proximity operations. The key challenges for the smaller dynamic network problem are that the constellation shape may change, collisions are possible between the craft, continuous knowledge of multiple vehicles in the system is non-trivial, and the spacecraft are typically much less powerful.

To overcome the technical limitations of conventional multi-agent spacecraft systems, a novel multi-agent spacecraft system is proposed. In some examples, the multi-agent spacecraft system comprises a chief spacecraft and one or more deputy spacecraft that implement relative navigation for rendezvous and proximity operations like rendezvous, capturing, deorbiting, surveying, inspection, properties identification, servicing, capture, or monitoring of a target RSO. The multi-agent spacecraft system comprises sensor payloads, edge compute, and software payloads for inspection, characterization, and 3D reconstruction of an RSO. High-level data products include center of mass, moments of inertia, as well as translational and rotational roll motion such as satellite pose estimation. The multi-agent spacecraft system comprises a relative navigation and capture system that hosts a deep neural network that comprises reinforcement learning rendezvous and proximity operation algorithms for multi-agent missions. The relative navigation and capture system further comprises software for computer vision, 3D reconstruction, and RSO characterization and roll determination. The system may be used for docking and capture operations based on output from the software stacks. The relative navigation and capture system comprises an optical payload using a 5° Narrow Field of View (NFOV) optic for computer vision and a 30° Wide Field of View (WFOV) optic for RSO acquisition and to maintain tracking. The scalable on-board computing systems comprise high-speed processor elements capable of 20-40 Trillions Of Operations Per Second (TOPS) at 7-15 W of power. These edge compute resources can be expanded based on the capabilities required to satisfy a broad range of mission sets. The on-board system may generate a real-time digital twin at the edge for dynamic mission operations.

The spacecraft system implements relative trajectory planning and control methods and hosts software for a group of deputy servicing spacecraft to safely fly around a target RSO for rendezvous and proximity operations. Each planned trajectory includes an ingress trajectory to defined task orbit, the task trajectory, followed by the egress back to the point of origin, along with the attitude of the spacecraft along its flightpath. The trajectories are planned based on the operational requirements such as minimal fuel consumption, no collision with the target RSO and optimization between the deputy vehicles themselves, sensing needs, time constraint, actuator constraints, etc. This enables the deputy spacecraft to relative orbit around an arbitrary point and does not require the deputy to have any awareness or perception of the target RSO. This is exemplary and derivations of deputy and chief spacecraft coordination for awareness, perception, and orbit state determination of an RSO are not exhaustive within the scope of this application. The relative navigation and capture software may comprise a reinforcement learning algorithm that comprises a "fully connected neural network" that learns a control policy to map positional state observations to a change in velocity ($\Delta V$) control outputs. This network can therefore be expanded to include 3D perception observations for the RSO such as spatial geometry models inferred from neural radiance 3D vision software. This is accomplished by using feature extraction on each input image which is fed into a convolutional neural network to match features across input images of the RSO for correspondence across the data. This data can be fed into a Neural Radiance Field to reconstruct a dense 3D model of the RSO which can be used as input into the reinforcement learning policy. The reward function can then be modified to reward an optimal docking trajectory with the object to perform reinforcement learning-based relative navigation via 3D encoding. After training in simulation, the result would be a learned controller that can dock with any object seen in the vehicle's optics using the 3D constructed object as the fiducial. The technology described herein comprises a unique approach to apply machine learning technology to a distributed system for decentralized inspection and control while integrating a computer vision software stack that allows the vehicles to dynamically adjust based on the 3D characteristics of the RSO being observed. This adds a world view layer, perception layer, and a control layer leading to full autonomy. Now referring to the Figures.

FIG. 1 comprises view 100. View 100 illustrates multi-agent spacecraft system 101. Multi-agent spacecraft system 101 performs operations like RSO rendezvous, surveying, inspection, properties identification, servicing, capture, deorbiting, and monitoring. Multi-agent spacecraft system 101 comprises primary spacecraft 111, secondary spacecraft 112 and RSO 120. In this example, spacecraft 111, spacecraft 112, and RSO 120 are located in space orbiting a primary body (e.g., the Earth, the moon, etc.). RSO 120 may comprise space debris, another spacecraft (e.g., an adversary satellite), a space station, a rocket body, a weapon, a projectile, a natural space object (e.g., an asteroid), and the like. Although system 101 is illustrated comprising two individual spacecraft, system 101 may comprise any number of spacecraft (e.g., one primary and three secondary spacecraft). It should be appreciated that the physical size of spacecraft 111 and 112 is not limited and that they may comprise nano-satellites, small satellites, medium satellites, large satellites, and/or any other suitable size of satellite. Moreover, system 101 may include one or more ground assets like terrestrial based control systems, vehicles, aircraft, seacraft, rovers, static structures, and the like. In other examples, system 101 may comprise different or additional components than those illustrated in FIG. 1.

Various examples of operation and configuration of multi-agent spacecraft system 101 are disclosed herein. In some examples, primary spacecraft 111 detects RSO 120. For example, primary spacecraft 111 may receive a command from a terrestrial system to intercept RSO 120 and/or may inspect RSO 120 in response to a software trigger. In response, primary spacecraft 111 enters the orbit of RSO 120 and deploys secondary spacecraft 112. Secondary spacecraft 112 travels along its ingress trajectory to its task trajectory. The task trajectory comprises a relative orbit around RSO 120. It should be appreciated that when secondary spacecraft 112 orbits RSO 120, both RSO 120 and secondary spacecraft 112 still orbit the primary body. While on its task and/or ingress trajectories, secondary spacecraft 112 senses RSO 120. For example, secondary spacecraft 112 may image RSO 120 to generate a 3D digital twin which it may use to navigate around RSO 120. Once secondary spacecraft 112 finishes sensing RSO 120, spacecraft 112 exits its task trajectory and returns to primary spacecraft 111 along its egress trajectory. Upon return, secondary spacecraft 112 docks with primary spacecraft 111 and loads data characterizing RSO 120 to primary spacecraft 111. In some examples, primary spacecraft 111 and/or secondary spacecraft 112 use the RSO data to service, capture, deorbit, or perform some other proximity operation on RSO 120. Similarly, primary spacecraft 111 and secondary spacecraft 112 may have an established communication connection during the ingress trajectory, task trajectory and egress trajectory to facilitate a faster syncing of characterization data.

Spacecraft 111 and 112 may comprise imaging systems, computing systems, communication systems, sensor suites, propulsion systems, and energy generation systems. The imaging systems may comprise cameras, WFOV cameras, NFOV cameras, and the like to sense RSO 120. The imaging systems may comprise monocular imaging systems (e.g., single camera) or multi-camera imaging systems. For example, the imaging systems may comprise Electro-Optical (EO)/Infrared (IR) cameras equipped with a WFOV static camera and a steerable mirror to actively track RSO 120. The imaging systems comprise optics, detector/digitization circuitry, image processors, transceivers, actuators, and deployment mechanisms. The imaging systems may image in the visible spectrum, non-visible spectrums, lidar, monochromatic optics, Red-Green-Blue (RGB), IR and/or other sensing modalities for input data. The optics comprise lenses, mirrors, and the like. The imaging systems may additionally comprise laser rangefinders, radars, and/or Radio Frequency (RF) sensors to detect and track the distance between RSO 120 and the spacecraft. For example, the RF sensors may be used to detect signals emitted by an RSO to detect the RSO.

The computing systems comprise microprocessors, software, memory, transceivers, GPUs, CPUs, compute clusters, bus circuitry, and the like. The memories comprise one or more computer-readable storage media operatively coupled to the microprocessors, and store program instructions that, based on being read and executed by the microprocessors, direct the computing system to perform various functions. The computing systems of spacecraft 111 and 112 may communicate with one another or with terrestrial based systems using on-board communication systems. The microprocessors comprise Central Processing Units (CPU), Graphical Processing Units (GPU), Vision Processing Units (VPU), Digital Signal Processors (DSP), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, flight software, Artificial Intelligence (AI)/Machine Learning (ML) algorithms, computer vision applications, relative navigation applications, and the like. The microprocessors retrieve the software from the memories and execute the software to drive the operation of system 101 as described herein.

The computing systems may host machine learning engines that comprise algorithms trained to autonomously plan ingress, egress and task trajectories for proximity operations and algorithms trained to generate 3D surface reconstructions of RSOs. Exemplary machine learning algorithms that may be employed solely or in conjunction with one another include 3D deep leaning models, 3D convolutional neural networks, reinforcement learning algorithms, neural radiance fields, times series convolutional deep learning, transformers, multi-layer perception, long term short memory, and attention based deep learning model. Other exemplary machine learning algorithms include artificial neural networks, nearest neighbor methods, ensemble random forests, support vector machines, naïve Bayes methods, linear regressions, or similar machine learning techniques or combinations thereof capable of predicting output based on input data.

The communication systems comprise antennas, lasers/detectors, amplifiers, filters, modulation, analog/digital interfaces, microprocessors, software, memories, transceivers, bus circuitry, and the like. Spacecraft 111 and 112 communicate with each other using inter-satellite communication protocols over wireless and/or optical communication links. The wireless communication links comprise optical links, S-band links, Ka-band links, X-band links, and the like. Spacecraft 111 and 112 may autonomously connect and collaborate for power, mission, data, communications, through common and standardized interfaces.

The propulsion systems comprise thrusters to perform various orbital changes, station keeping, trajectory modification, RSO flybys, pointing/aiming activities, and other maneuvers. The thrusters may comprise a Reaction Control System (RCS). The RCS thrusters provide attitude control and translation and provide torque to allow control of spacecraft rotation (roll, pitch, and yaw). The thrusters may comprise chemical thrusters, electric thrusters, or a combination thereof. The chemical thrusters may utilize propellant tanks and pumps or pressure-fed components to produce hot gas exhaust for quick thrust, low duration maneuvers and orientations. Acceptable propellant types include bipropellant, monopropellant, and hypergolic. The electric thrusters utilize accelerated ions or ionized particles to accelerate plasmas for low thrust, long duration (high Isp) maneuvers and orientations. The electric thrusters may comprise ion thrusters (e.g., Hall thrusters, helicon RF thrusters, gridded ion thrusters, colloid thrusters, and the like), electromagnetic thrusters (e.g., plasma propulsion thrusters, magneto-plasma thrusters, and the like), and electrothermal thrusters. Other spacecraft mounted propulsion systems that may be used include solar sails, nuclear propulsion, gravity assist, gyroscopic orientation devices, reaction wheels, flywheels, and the like. The spacecrafts activate their propulsion systems using maneuver commands generated autonomously based on data (e.g., velocity, position, target position) shared amongst the spacecrafts to inspect or otherwise affect RSO 120.

The power generation systems may comprise solar arrays, batteries, electrical connections, and the like. The solar arrays comprise photovoltaic solar panels. The solar panels are constructed from photovoltaic materials like polycrystalline or monocrystalline silicon. The solar panels may comprise a flat or curved geometry. For example, the solar panels may be in the shape of a parabolic dish. The solar panels absorb electromagnetic radiation produced by the sun and convert the absorbed radiation into electricity. The solar panels transfer the electricity to the batteries which store the electricity to power the various electrical components of spacecraft 111 and 112.

Spacecraft 111 and 112 may comprise other sensors and orientation instruments like sun sensors, star trackers, accelerometers, gyros providing PAC processing, data handling systems, storage systems, and metrology systems. Spacecraft 111 and 112 may comprise reaction wheels, control moment gyroscopes, momentum dumping thrusters, temperature control systems to manage passive and actively controlled thermal, SSA sensors, visual and lidar sensors, and/or other set of sensors.

In some examples, system 101 may be used in military defense applications. In such examples, RSO 120 may comprise a weapon or adversary satellite. System 101 may be used to capture RSO 120 and modify the orbit/trajectory of RSO 120 to inhibit malicious operations. In some examples, system 101 may be used in planetary defense applications. In such examples, RSO 120 may comprise a hazardous near-earth object (e.g., an asteroid). System 101 may be used to assess the geological make-up of the RSO 120, and determine an adequate location to capture RSO 120, and redirect the RSO 120 to a harmless trajectory.

In some examples, the spacecraft of multi-agent spacecraft system 101 may comprise multiple secondary spacecraft to perform proximity operations on RSO 120. The multiple secondary spacecraft arrange themselves autonomously to safely intercept RSOs. The multiple secondary spacecraft may execute genetic algorithms to generate trajectories for the group, given a set of restrictions that the group will abide by. For example, the spacecraft may generate and share maneuver data indicating their position, velocity, trajectory, orientation, and the like and maneuver based on the shared data to avoid collisions and enter an orbit to pass by RSO 120. The spacecraft utilize the trajectories so that intercepting spacecraft may perform their required individual actions, while minimizing the fuel required for maneuvering and also avoiding conjunctions, to a prescribed probability of collision, for a given amount of time. For example, the spacecraft may host reinforcement learning algorithms to determine maneuvers and optimize fuel use based on the trajectory data and image data characterizing RSO 120. In the instance that one or more of the spacecraft in multi-agent spacecraft system 101 is not functioning or is destroyed, the spacecraft act as a self-healing mesh network and reorganizes itself autonomously to optimize the relative navigation and proximity operations.

FIG. 2 illustrates process 200. Process 200 comprises an exemplary operation of multi-agent spacecraft system 101 to intercept an RSO. The operations of process 200 comprise the chief spacecraft maneuvering to the orbit of the RSO (step 201). The operations further comprise the chief spacecraft deploying the deputy spacecraft to rendezvous with the RSO (step 202). The operations further comprise the deputy spacecraft maneuvering to the RSO (step 203). The operations further comprise the deputy spacecraft sensing the RSO during the rendezvous and proximity operations maneuver (step 204). The operations further comprise the deputy spacecraft generating a 3D surface reconstruction of the RSO based on the sensing (step 205). The operations further comprise the deputy spacecraft determining a roll rate and a relative trajectory of the RSO based on the sensing (step 206). The operations further comprise the deputy spacecraft returning to the chief spacecraft (step 207). The operation may differ in other examples.

Referring back to FIG. 1, view 100 includes a brief example of process 200 as employed by one or more hardware systems and software applications of multi-agent spacecraft system 101. In some examples, primary spacecraft 111 is stationed in orbit around the primary body. Spacecraft 111 wirelessly receives a command from a static command system on the surface of the primary body to intercept RSO 120. The command includes the orbit and/or other trajectory/location data for RSO 120. In response to the command, spacecraft 111 activates its propulsion systems to enter the orbit of RSO 120. With secondary spacecraft 112 still mounted to primary spacecraft 111, spacecraft 111 maneuvers along the orbit of RSO 120 to a spatial location proximate (e.g., 1 km) to RSO 120 (step 201). The proximate location represents the start point of the ingress trajectory of secondary spacecraft 112.

While at the proximate location, primary spacecraft 111 senses RSO 120 using its onboard sensor suite. For example, spacecraft 111 may image optically and perform lidar/radar on RSO 120 to determine the location of RSO 120 relative to spacecraft 111, the velocity of RSO 120, and/or other data describing the motion/location of RSO 120. Spacecraft 111 calculates passive relative orbits for secondary satellite 112 to travel to, perform a relative orbit of, and return from RSO 120 based on the sensed motion/location data of RSO 120. Spacecraft 111 determines the needed changes in velocity for deputy spacecraft 112 to enter the calculated passive relative orbits. Spacecraft 111 loads a mission plan that includes burn times, a standoff distance (e.g., from RSO 120), and mission requirements (e.g., imaging, docking, etc.) to secondary spacecraft 112. Spacecraft 111 adjusts its attitude (e.g., orientation) to point secondary spacecraft 112 on the passive relative orbit. Once the attitude is adjusted, primary spacecraft 111 deploys secondary spacecraft 112 (step 202).

When deployed from primary spacecraft 111, secondary spacecraft 112 activates its propulsion system for the prescribed burn time to enter into the passive relative orbit calculated by spacecraft 111. As spacecraft 112 travels along its orbit to RSO 120, spacecraft 112 uses its imaging systems to image RSO 120. Spacecraft 112 develops a digital twin based on the imaging that tracks the relative position of RSO 120. Spacecraft 112 calculates a task trajectory to sense RSO 120 based on the prescribed standoff distance and mission requirements. For example, if the mission entails generating a 3D surface reconstruction of RSO 120, secondary spacecraft 112 may create a task trajectory to orbit RSO 120 along multiple inclinations to fully image RSO 120. When the ingress trajectory of the passive relative orbit of secondary spacecraft 112 intersects the task trajectory, spacecraft 112 activates its propulsion system for the prescribed burn time to enter into the task trajectory. It should be appreciated that the task trajectory also comprises a passive relative orbit of RSO 120.

Secondary spacecraft 112 orbits RSO 120 along multiple inclinations (step 203). While in the task trajectory, spacecraft 112 images or otherwise senses RSO 120 (step 204). Typically, secondary spacecraft 112 continually adjusts its attitude while orbiting RSO 120 to keep RSO 120 in the field of view of its imaging/sensing systems. Spacecraft 112 may use the digital twin, Proportional-Integral-Derivative (PID) control, fuzzy-logic based learning control, or some other type of control to adjust its attitude. Spacecraft 112 uses the resulting images and/or other sensor data (e.g., x-ray scans) to generate a 3D surface reconstruction of the RSO (step 205). In addition to generating the surface reconstruction, spacecraft 112 determines the roll rate and relative trajectory of RSO 120 based on the images/sensor data (step 206). For example, the computing systems of spacecraft 112 may host a machine learning engine that comprises algorithms trained to generate 3D surface reconstructions, determine roll rates, and determine relative trajectories based on RSO images.

When the 3D reconstruction is complete and the roll rate and relative trajectory of RSO 120 is determined, secondary spacecraft 112 determines the mission is concluded. In response, spacecraft 112 activates its propulsion systems for the prescribed burn time to reenter the passive relative orbit calculated to return to primary spacecraft 112. It should be appreciated that the ingress/egress points to/from the task trajectory may be the same or different. Spacecraft 112 travels along the passive relative orbit to primary spacecraft 111 (step 207). Upon reaching primary spacecraft 111, secondary spacecraft 112 activates its propulsion system to exit the passive relative orbit. Spacecrafts 111 and 112 adjust their attitude to prepare for docking. Once aligned, secondary spacecraft 112 docks with primary spacecraft 111 and loads the 3D surface reconstruction, roll rate, relative trajectory, and/or other data characterizing RSO 120 to primary spacecraft 111. Primary spacecraft 111 and/or secondary spacecraft 112 may use the loaded data to perform a service, capture, deorbit, or some other type of proximity operation with RSO 120. In some examples, secondary spacecraft 112 may continuously or periodically load data to primary spacecraft 111 during its rendezvous mission with RSO 120. For example, secondary spacecraft 112 may wirelessly transfer the image data, 3D surface reconstruction, roll rate, relative trajectory, and/or other data characterizing RSO 120 as this information is generated by spacecraft 112 during the rendezvous mission. Primary spacecraft 111 may use this data to generate its own 3D reconstruction of RSO 120 while secondary spacecraft 112 performs the rendezvous mission.

Figure 3:
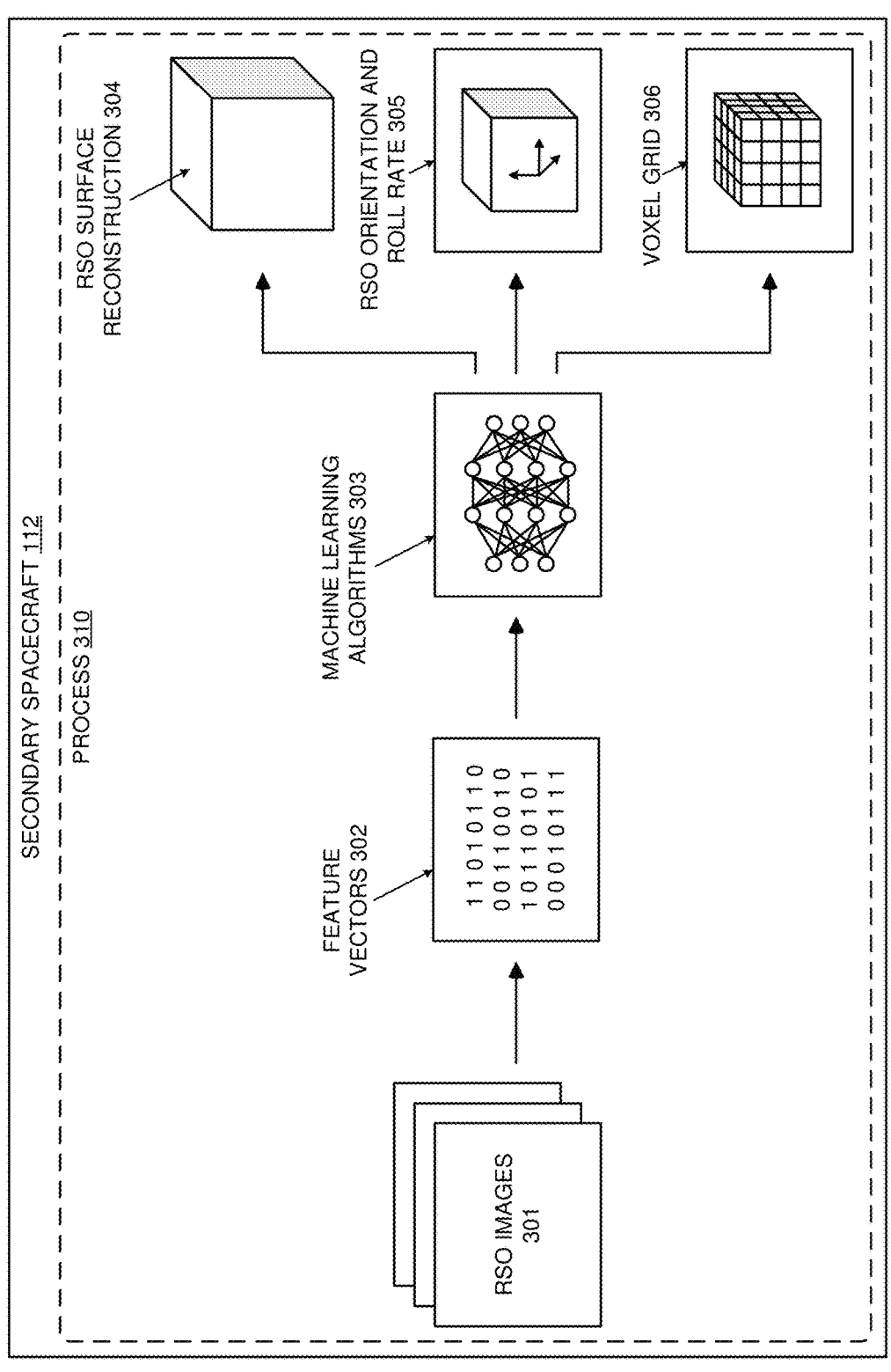
FIG. 3 illustrates an exemplary spacecraft operation in the multi-agent spacecraft system.

FIG. 3 comprises view 300. View 300 illustrates secondary spacecraft 112 in multi-agent spacecraft system 101. In some examples, the computing system of secondary spacecraft 112 implements process 310 illustrated in FIG. 3. While in its task trajectory, the imaging system of spacecraft 112 captures RSO images 301 that depict RSO 120. The computing system receives images 301 and generates feature vectors 302. Feature vectors 302 comprise numeric representations of RSO images 301 and encompass features defined as both physical and abstract key points that can be used to uniquely identify these key points in subsequent images. For example, feature vectors 302 may comprise sets of numbers that represent pixel values of the WFOV images. The computing system provides feature vectors 302 to machine learning algorithms 303. Algorithms 303 are trained to generate surface reconstructions, determine orientations and roll rates, and generate voxel grids of RSOs based on images that depict the RSOs. Machine learning algorithms 303 processes the feature vectors and responsively generates an output that comprises RSO surface reconstruction 304, RSO orientation and roll rate 305, and RSO voxel grid 306. Reconstruction 304 comprises a 3D model that depicts the surface features of RSO 120. Orientation and roll rate 305 describes the pose and roll rate of RSO 120 relative to secondary spacecraft 112. The roll rate may be relative to secondary spacecraft 112, relative to the primary body (e.g., Earth), and/or relative to RSO 120's own inertial reference frame. This calculated roll rate may be transformed between the different orientation matrices to accommodate any desired roll rate format. Voxel grid 306 comprises a set of 3D polygons (e.g., cubes) that define the boundaries of RSO 120 in 3D space which will be the primary input to the reinforcement learning trajectory planning algorithms for collision avoidance and docking.

Advantageously, multi-agent spacecraft system 101 effectively and efficiently performs rendezvous and proximity operations. The trajectory planning and control operations of system 101 provides a practical and efficient solution for active debris removal, on-orbit servicing, formation flying, space rendezvous and docking, proximity operations, and space exploration missions. System 101 handles mission constraints and uncertainties during the operations to ensure safe and energy efficient relative motion between the deputy and target spacecraft.

FIG. 4 comprises view 400. View 400 illustrates multi-agent spacecraft system 401. Multi-agent spacecraft system 401 comprises an example of multi-agent spacecraft system 101 illustrated in FIG. 1, however system 101 may differ. Multi-agent spacecraft system 401 comprises terrestrial systems 410, chief satellite 420, deputy satellites 431-433, and target satellite 450. Chief satellite 420 comprises avionics 421, sensor suite 422, and servicing payload 423. Sensor suite 422 comprise cameras, rangefinders, radars, and/or other sensor equipment that allows chief satellite 420 to detect RSOs like target satellite 450. Deputy satellite 431 comprises avionics 441 and imaging system 442. Avionics 441 and imaging system 442 form a relative navigation and capture system with scalable processing resources that allows multi-agent system 401 to perform effective and efficient rendezvous and proximity operations. Deputy satellites 432 and 433 comprise a similar architecture to deputy satellite 431. The avionics and imaging systems of chief 420 and deputy satellites 432-433 may also form relative navigation and capture systems with scalable processing resources. In other examples, multi-agent spacecraft system 401 may comprise different or additional components than those illustrated in FIG. 4.

In some examples, chief satellite 420 and deputy satellites 431-433 form a multi-agent satellite system to perform rendezvous and proximity operations like in-space servicing, rendezvous, surveying, inspection, properties identification, capture, deorbiting, monitoring, edge processing, and the like. Satellites 420 and 431-433 may approach and rendezvous with the orbital object (including space debris, etc.) using approach and rendezvous proximity operations algorithms. Satellites 420 and 431-433 may autonomously inspect, sense, characterize, and develop a plan to capture target objects. Satellites 420 and 431-433 may capture and control the orbital object and/or perform rendezvous proximity operations docking. Further capabilities include space domain awareness, space behavior awareness through persistent stare and close proximity monitoring and inspection, and path planning for ISAM. Satellites 420 and 431-433 may be used in conjunction with a space-based sensor decentralized network to provide anomaly detection and persistent monitoring of RSOs from small debris to enemy activity for intelligence and automated conjunction assessment. The avionics of satellites 420 and 431-433 host a software stack that enable the satellites to perform complex maneuvers autonomously which enables satellite servicing and maintenance, in-orbit assembly of structures, and deployment/retrieval of small satellites.

Chief satellite 420 is a larger, high-cost, fully equipped, modular, reconfigurable, and very capable servicing spacecraft having strong orbital maneuverability, scalable GPU clusters and robotics capabilities for various In-Space Servicing, Assembly and Manufacturing (ISAM) tasks. On the other hand, deputies 431-433 are a class of spacecrafts that are small, simple, low-cost, attritable, with edge compute and generally less capable in functions and performance than chief 420. As illustrated in FIG. 4, deputies 431-433 are mounted to and deployable from chief satellite 420. With a multi-agent servicing team, chief 420 may deploy deputies 431-433 to perform team tasks to take advantage of teamwork's constructive collaboration, time and energy efficiency, and operational resilience. However, it should be appreciated that when a deputy is deployed from chief 420, the deputy has a limited ΔV and electric power available for maneuvering and visual sensing. When required, deputies 431-433 may fly back and reconnect to chief 420 for refueling and recharging before their energy is used up. The reconnection action can be done either through rendezvous and docking or through berthing by a robotic arm (e.g., servicing payload 423) of chief 420.

In a typical team operation task, chief 420 may receive an order from a command center (e.g., terrestrial systems 410), ordering it to travel to the RSO (e.g., target satellite 450) to gather visual information of the entire body of the target. In response, chief 420 detects and tracks RSOs of interest using a broad suite of sensors (e.g., sensor suite 422). Chief 420 travels to an ingress point near the RSO (e.g., 1 km) in the same orbit with deputies 431-433 docked. Chief 420 adjusts its attitude based on the deputy rendezvous and proximity operations trajectory to minimize fuel consumption and deploys the deputies sequentially. Deputies 431-433 fly into their relative trajectories around the RSO for their group task. After completion of the task in their planned trajectories, deputies 431-433 exit the relative trajectories and fly back toward chief 420. Deputies 431-433 rendezvous and dock to chief 420 for re-charging, re-fueling, and ready for the next task.

Deputies 431-433 may use passive relative orbits to travel to and from target RSOs. Passive relative orbits comprise energy efficient trajectories for spacecraft because these trajectories, in theory, do not require any fuel for spacecraft to travel along them because their relative orbiting motions are driven by gravity. The flight time for deputies 431-433 to complete one cycle of a passive relative orbit trajectory is the same as the target (and chief 420) to complete one period of its Earth orbit. This means that for deputies 431-433 to fly around an RSO will require one to two hours if the RSO is in a low-earth orbit and 24 hours if the RSO is in geosynchronous orbit. A passive relative orbit flight only requires as little as just 1% of the energy of an active trajectory. The optimization of a passive relative orbit is a multi-dimensional constrained nonlinear optimization problem where an objective can be energy minimization or other metrics (e.g., time) depending on the mission. The inputs to the solution procedures are the applicable requirement specifications and the outputs are the trajectory functions or data and the required AVs at four points (the starting point, the entry point, the exit point, and the returning point).

When performing an inspection of an RSO of unknown characteristics, chief 420 and/or deputies 431-433 may develop a metric to ensure adequate coverage of the entire surface is obtained. To facilitate full coverage of the RSO body of any shape, a circumscribed sphere is defined as the collision-free boundary and then a Goldberg Polyhedron is used to cover the surface of the sphere. A Goldberg Polyhedron is a convex polyhedron consisting of pentagons and hexagons (like a soccer ball surface). The size of the polygons or the total number of the polygons may be determined based on the sensing and operation requirements. The circumscribed sphere's surface is divided into an n-pentagon and hexagon regions and the deputies' image or inspect these regions one after another while flying around the RSO to ensure a full coverage of the entire surface. As a deputy spacecraft (e.g., deputy 431) flies around the RSO (e.g., target 450), the camera field of view is projected onto the Goldberg Polyhedron and if a hexagon or pentagon is completely enclosed within the field of view, this face is designated as covered. Conversely, based on target illumination or partial illumination, the machine learning engines hosted by spacecraft 420 and 431-433 will designate coverage accordingly. Similarly, based on the nature and classification of the RSO, this polyhedron may be stationary relative to the RSO's inertial reference frame, or stationary relative to the RSO's non-inertial reference frame, and thus influence the optimization of the machine learning algorithms and deputy coverage analytics.

The goal of the control for tracking a planned passive relative orbit trajectory is to ensure that deputies 431-433 will accurately travel on the task trajectories as planned. This may be done by implementing a discrete feedback controller on each deputy, so that trajectory correction burns can be fired whenever the craft drifts away from the planned trajectory beyond a preset tolerance value. The controller may comprise a simple PID controller, or a fuzzy-logic based learning controller. In either case, energy saving may be the main objective along with the goal of keeping deputies 431-433 on the right track. Sensor suite 422 of chief 420 may oversee the deputy flight path as well and provide higher fidelity boundary keeping.

In some examples, system 401 may plan and control active trajectories. Active relative orbit trajectory planning and control may be used for space missions such as active debris removal, on-orbit servicing, and formation flying. Active relative orbit trajectory planning involves the determination of a desired trajectory of a deputy spacecraft relative to a target spacecraft or a reference frame using periodic maneuvering to perform or maintain the relative positioning, while active relative orbit control refers to the implementation of the planned trajectory to ensure the desired relative motion. Adding active relative orbit maneuvers to the mission scope enables trades to be made between reducing the time of response at the expense of minimizing ΔV which would be achieved with a passive relative orbit trajectory. Active relative orbit trajectory planning and control considers various constraints, such as collision avoidance, energy efficiency considering propulsion limits, and flight time. In some examples, satellites 420 and 431-433 utilize reinforcement learning based control for active relative orbit trajectory planning. For example, the avionics of satellites 420 and 431-433 may host physics-based model predictive control algorithms to perform active relative orbit trajectory planning approach.

When flying around an RSO, deputies 431-433 are often required to keep facing the RSO or point. The sensing instruments of deputies 431-433 are faced toward a specific surface area of the RSO. Given the formulation for trajectories the pointing direction to the RSO can be directly calculated for any given time (e.g., as the vector normal to the deputies' orbit). It can be assumed that the passive relative orbit trajectories are planar, periodical, closed-loop curve and with the RSO at the relative trajectory's center, and hence, its direction is always normal to the trajectory plane. As for an active relative orbit task trajectory, the associated attitude trajectory depends on the task trajectory and its active control goal.

The avionics of satellites 420 and 431-433 may host 3D computer vision software to extend their relative navigation capabilities. The 3D computer vision tasks involve six degree-of-freedom pose determination and 3D surface reconstruction using monocular or multi-camera imagery and may not require the use of other sensors. A single camera (e.g., imaging system 442) may be used to provide image inputs to the computer vision software as opposed to current methods which require 4 to 16 sensors. The six degree-of-freedom pose tracking accounts for unknown tumble rates. Satellites 420 and 431-433 may track and reconstruct any object regardless of shape, size, and state. The computer vision software may run in real-time on low Size, Weight, and Power (SWAP) edge compute or on a GPU cluster within the vehicle depending on its configuration. The computer vision software outputs a 3D surface model with six degree-of-freedom trajectory that satellites 431-433 may use for navigation, inspection, and many other autonomy tasks. The result is a real-time 3D digital twin of the RSO generated onboard the vehicle by only a single (or multiple) optical sensor on any spacecraft. The digital twin may be used for relative trajectory and roll-rate/tumble determination, 3D mesh analysis, and spatial maps for relative navigation, and docking on brand new objects. Multi-agent teaming can further improve the inferencing capabilities with faster and redundant data collection. The six degree-of-freedom pose determination algorithm may be implemented using convolutional neural networks, multi-image feature matching, and pose graph optimization.

The computer vision software allows satellites 420 and 431-433 to determine the trajectory of an object with possibly sporadic, unknown motion (i.e., tumbling or maneuvering) relative to the observer. After pose determination, the satellites 420 and 431-433 may have a sequence of images of an object with associated pose within that image, which can be used as input to 3D surface reconstruction algorithms. High fidelity 3D detail may be achieved with neural radiance fields, which optimizes a volumetric representation of a scene based on images from multiple views. The result is a highly detailed 3D point cloud of the object which can be downlinked and inspected or used for further autonomous on-board inferencing such as relative navigation. The passive relative orbit and active relative orbit neural networks can be expanded to include 3D perception information as additional inputs to allow for autonomous relative navigation and docking capabilities. Additional convolutional layers may be added to the neural network to encode the 3D observations into the reinforcement learning policy, along with additional encoding for roll rate and trajectory to account for RSO tumble or active maneuvers. The reward function can then be modified to reward an optimal docking trajectory with the object, which after training in simulation, would result in a learned control policy that can dock with any object observed in the deputy's imaging system.

Terrestrial systems 410 are representative of one or more command and control systems for satellites 421-423. Terrestrial systems 410 may comprise computing systems and communication systems (e.g., antennas) to receive satellite data and/or transmit control signaling to satellites 421-423. For example, terrestrial systems 410 may receive a servicing request from the operator of target satellite 450 and responsively transfer a servicing command to chief satellite 420 to rendezvous with and service target 450. Although terrestrial systems 410 may be used for ground-based control of satellites 420 and 431-433, typically the latency requirements for close proximity satellite maneuvers inhibit ground-based control from being effective.

Figure 5:
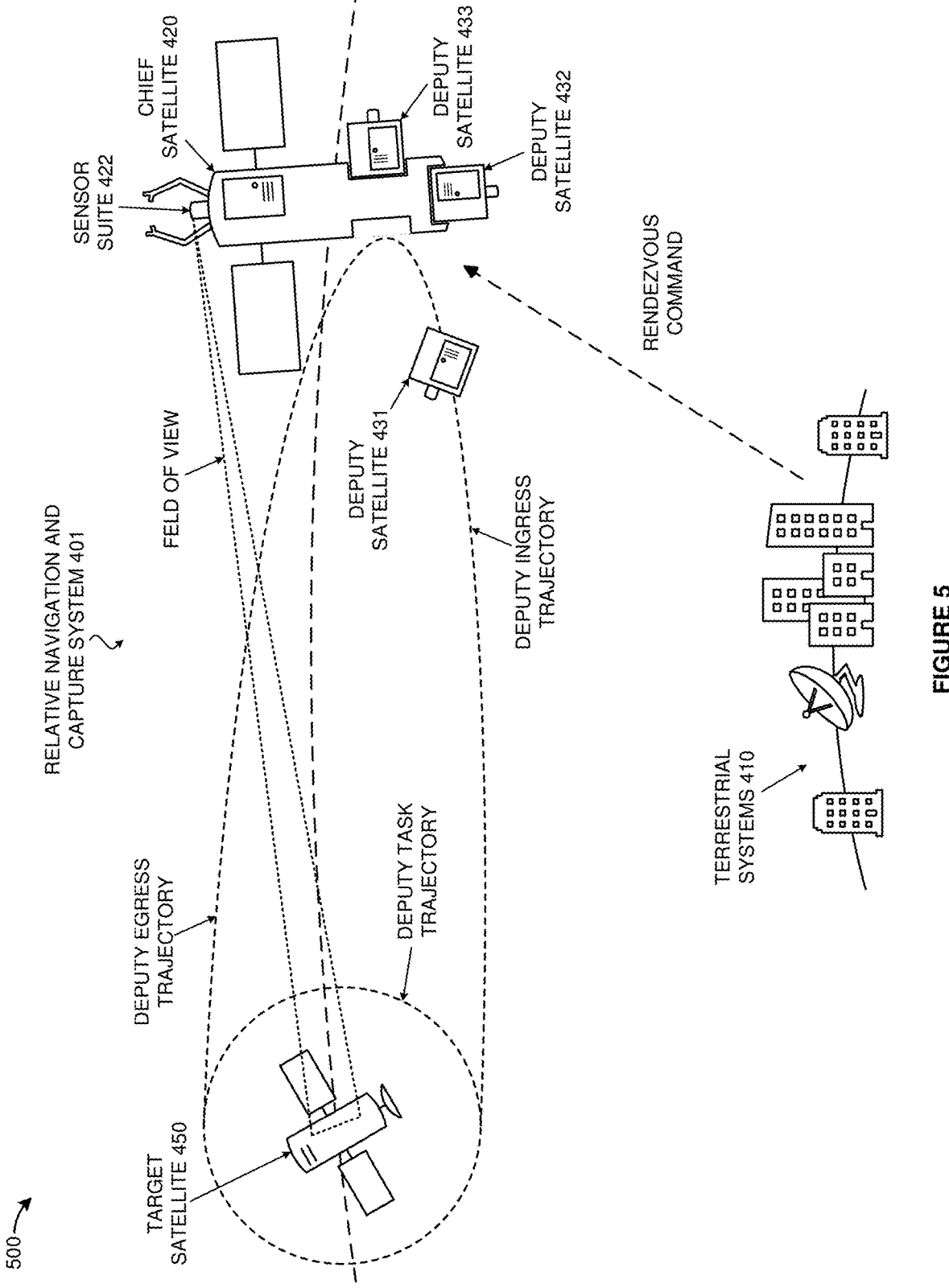
FIG. 5 further illustrates the multi-agent spacecraft system.

FIGS. 5-10 comprise views 500-1000. Views 500-1000 illustrate a rendezvous and proximity operational sequence performed by system 401. As illustrated in FIG. 5, terrestrial systems 410 wirelessly transfers a rendezvous command to chief satellite 420. For example, target satellite 450 may require servicing, deorbiting, relocation, or some other type of in-orbit operation and terrestrial systems 410 may responsively transfer the rendezvous command to chief satellite 420. The command includes a mission descriptor (e.g., service, deorbit, etc.) as well as location and orbit data for target 450.

In response to receiving the rendezvous command, avionics 421 directs the propulsion system of chief satellite 420 to modify the satellite's orbit to match that of target satellite 450. Chief satellite 420 travels along the orbit (or via another pathway) of target 450 to an ingress point or orbital location proximate to target 450. Chief satellite 420 utilizes sensor suite 422 to detect target 450 (e.g., by visual sensing, lidar, radar, etc.) and determines the relative location of satellite 450. Based on the relative location of target 450, chief 450 determines passive relative orbit transfer trajectories for deputy deployment to and from the Target satellite 450 and chief 420, as well as passive relative orbit task trajectories around the RSO. Each of the two transfer trajectories are associated only with two ΔV burns. Avionics 421 may calculate the minimal ΔV vector (magnitude and direction) of each burn using two different approaches namely, a traditional nonlinear optimization method and a machine learning method. For example, avionics 421 may generate feature vectors that indicate the relative position and velocity and provide the feature vectors to its on-board machine learning engine which then provides ingress, task, and egress trajectories for deputies 431-433. In some examples, chief 420 and/or deputies 431-433 may instead implement an active relative trajectory planning and control method that may ensure collision-free, energy-efficient, and time-efficient relative motion between the deputies and target spacecraft. For example, avionics 421 may determine the optimal trajectory for a deputy that satisfies the mission constraints. In some examples, chief 420 may assist and impart some level of ΔV to the deployed deputy vehicle through propulsive, actuation, or additional mechanical payload interfaces to help minimize the ΔV requirements of the mission.

Once the passive relative orbits are calculated for deputy satellites 431-433, chief satellite 420 adjusts its attitude to orient deputy satellite 431 along its passive orbit to target satellite 450. Chief 420 deploys deputy 431 which flies towards target 450 along its ingress trajectory. For example, chief 420 may load a flight plan onto deputy 431. The flight plans may comprise a set of maneuvers like thruster activation commands, thruster deactivation commands, thrust times, and dynamic aiming commands to place satellite 431 on its ingress and egress trajectories. Deputy satellite 431 enters its ingress trajectory using the flight plan received from chief 420. Varying levels of communication may be supported within system 401, allowing for options ranging from continuous communication to zero communication with the deputy throughout the mission.

As illustrated in FIGS. 6 and 7, chief satellite 420 continues to adjust its attitude to sequentially deploy deputies 432 and 433. Deputies 432 and 433 execute their respective flight plans to enter their ingress trajectories to target 450. As illustrated in FIG. 8, when deputies 431-433 reach target satellite 450, deputies 431-433 enter their task trajectories to orbit target satellite 450. The proximity between deputies 431-433 and target 450 may depend on fuel use constraints, threat level, imaging requirements, and the like. Although illustrated as all orbiting target 450 along the same trajectory, deputies 431-433 typically orbit target 450 along multiple different trajectories to ensure target 450 is fully imaged.

As satellites 431-433 orbit target 450, they image target 450 with their imaging systems. Their onboard avionics executes their compute vision software to generate full 3D surface reconstructions of target 450. The resulting 3D surface model comprises a six degree-of-freedom trajectory that may be used by satellites 431-433 for relative navigation around target 450. Deputies 431-433 may use the digital twin for relative trajectory and roll-rate/tumble determination, 3D mesh analysis, and spatial maps for relative navigation, and docking on target 450. Deputies 431-433 may generate additional data characterizing target 450 like high fidelity trajectory data, and vehicle characteristics like mass, size, moments of inertia, power estimates, weight, payload feature details, payload estimates determined during the flyby observation, and/or other RSO characteristics. In some examples, one or more of deputies 431-433 may dock with target satellite 450. For example, deputy 431 may dock with target 450 to perform an information exchange, perform diagnostics, to disable target 450, to perform a malicious action, and the like.

As illustrated in FIG. 9, once their task (or respective tasks) is complete, deputy satellites 431-433 activate their propulsion systems to enter a passive relative orbit that follows an egress trajectory back to chief satellite 420. Upon reaching chief satellite 420, deputies 431-433 dock with chief 420. Chief 420 may adjust its attitude to account for orbital differences between deputies 431-433 to facilitate docking. Once docked, deputies 431-433 may upload the collected (e.g., images) and generated (e.g., voxel grid) target information to chief 420. Likewise, chief 420 may refuel and refit deputies 431-433 for future missions. As noted previously, chief 420 may zero out all deputy payload data prior to docking depending on the level of communication between deputies 431-433 and chief 420 during the operation which may be a result of mission design, vehicle design, or target threat levels.

As illustrated in FIG. 10, chief satellite 420 generates a flight plan to maneuver to target satellite 450 to perform a servicing operation based on the target data uploaded by deputy satellites 431-433. For example, chief 420 may receive target data like a 3D surface reconstruction, high fidelity trajectory data, a voxel grid, a docking location, tumble rates, and moment of inertia, and vehicle characteristics like mass, size, power estimates, weight, payload feature details, and payload estimates from deputies 431-433. In response, avionics 421 may vectorize the received target data and input feature vectors into a machine learning navigation application trained to generate flight plans (e.g., an active relative orbit) based on the target data. Chief 420 activates its propulsion system based on the plan and flies to target satellite 450. Once in close proximity to target 450, chief 420 docks with target 450 and utilizes servicing payload 423 to service target 450. For example, chief 420 may repair a damaged component (e.g., a solar panel, antenna, etc.) on target satellite 450.

In some examples, target satellite 450 may instead comprise orbital debris (e.g., a spent rocket body) and satellites 420 and 431-433 may perform an active debris remediation operation. In such examples, satellites 420-433 operate similarly to rendezvous with and characterize target 450. For example, deputies 431-433 may visually inspect the target debris and create a 3D model of its surface, using neural radiance fields techniques. The avionics in deputies 431-433 may infer the target debris' inertial and intrinsic properties (e.g., mass, center of mass, moment of inertia, translational and rotational motion, etc.). Using this information, as well as the reconstructed 3D surface model of the debris, deputies 431-433 calculate an optimal location to capture the debris. Deputies 431-433 determine necessary ΔV components along three separate axes to detumble the debris. One of deputies 431-433 docks with the debris and activates its attitude control systems (e.g., reaction wheels, torque rods, etc.) to impart the necessary ΔV to detumble the debris. Once detumbled, deputies 431-433 return and dock with chief 420. Chief 420 then maneuvers to and docks with the detumbled debris object. For example, servicing payload 423 may comprise robotic arms and chief may utilize the robotic arms to capture the debris. Chief 420 then modifies the velocity of the debris to safely deorbit the debris. In some examples, after the debris object is detumbled, deputies 431-433 may instead dock with the debris and impart the necessary ΔV (e.g., using their thrusters) to modify the velocity of the debris for safe deorbiting.

In some examples, target satellite 450 may instead comprise an adversary or otherwise malicious satellite. In such examples, satellites 420 and 431-433 may forgo servicing operations and instead just perform target inspection and characterization operations as described above. During the inspection process (e.g., when deputies 431-433 are in their task trajectories), the adversary/malicious satellite may activate its attitude control systems to attempt to hide its payload/capabilities. It should be appreciated that by using multiple teaming deputy satellites to perform vehicle inspection, adversary satellites are unable to effectively hide their capabilities using intentionally non-cooperative maneuvers. Once proximity inspection is complete, deputies 431-433 return and dock with chief 420. Chief 420 then downlinks the collected data (e.g., 3D models, payload estimate, etc.) to terrestrial systems 410. In some examples, chief 420 and/or deputies 431-433 may dock with an adversary/malicious satellite. For example, deputies 431-433 may dock with the adversary satellite and load software (e.g., spyware) onto the adversary satellite. For example, deputies 431-433 may dock with the adversary satellite and plant a small explosive to disable the adversary satellite. For example, deputies 431-433 may dock with and detumble the adversary satellite. Once detumbled, chief 420 docks with and captures the adversary satellite (e.g., to maintain custody, perform an orbit modification, etc.).

In some examples, deputies 431-433 may perform an internal inspection of target satellite 450 in addition to the surface scanning operations. For example, one of deputies 431-433 may be equipped with an x-ray emitter and another one of deputies 431-433 may be equipped with an x-ray detector. In their task trajectories, the emitter deputy and the receive deputy position themselves at the opposite ends of a shared orbit around target 450. For example, when at the opposite ends of a shared orbit, a vector drawn from the emitter deputy to the receiver deputy would intersect target 450. The emitter deputy emits x-rays that travel through target 450. The receiver deputy detects the x-rays after they pass through target 450. The receiver deputy may then construct a 3D model of the internal components based on the detected x-rays.

FIG. 11 illustrates process 1100. Process 1100 comprises an exemplary operation of deputies 431-433 to perform rendezvous and proximity operations with target satellite 450. Process 1100 comprises an example of process 200 illustrated in FIG. 2, however process 200 may differ. The operations of process 1100 comprise receiving a flight plan that comprises an ingress trajectory, a task trajectory, and an egress trajectory (step 1101). The operations further comprise directing a propulsion system to implement the ingress trajectory to rendezvous with an RSO in response to deploying from a chief spacecraft (step 1102). The operations further comprise directing an attitude system to point to the RSO based on the task trajectory (step 1103). The operations further comprise utilizing an imaging system to image the RSO (step 1104). The operations further comprise generating feature vectors that represent the key points in the images of the RSO (step 1105). The operations further comprise inputting the feature vectors into a machine learning engine that comprises algorithms trained to generate a 3D surface reconstruction and determine a roll rate and relative trajectory of the RSO based on the images (step 1106). The operations further comprise receiving a machine learning output that comprises the 3D surface reconstruction, the roll rate, and the relative trajectory of the RSO based on the images (step 1107). The operations further comprise directing the propulsion system to implement the egress trajectory to return to and dock with the chief spacecraft (step 1108).

Figure 12:
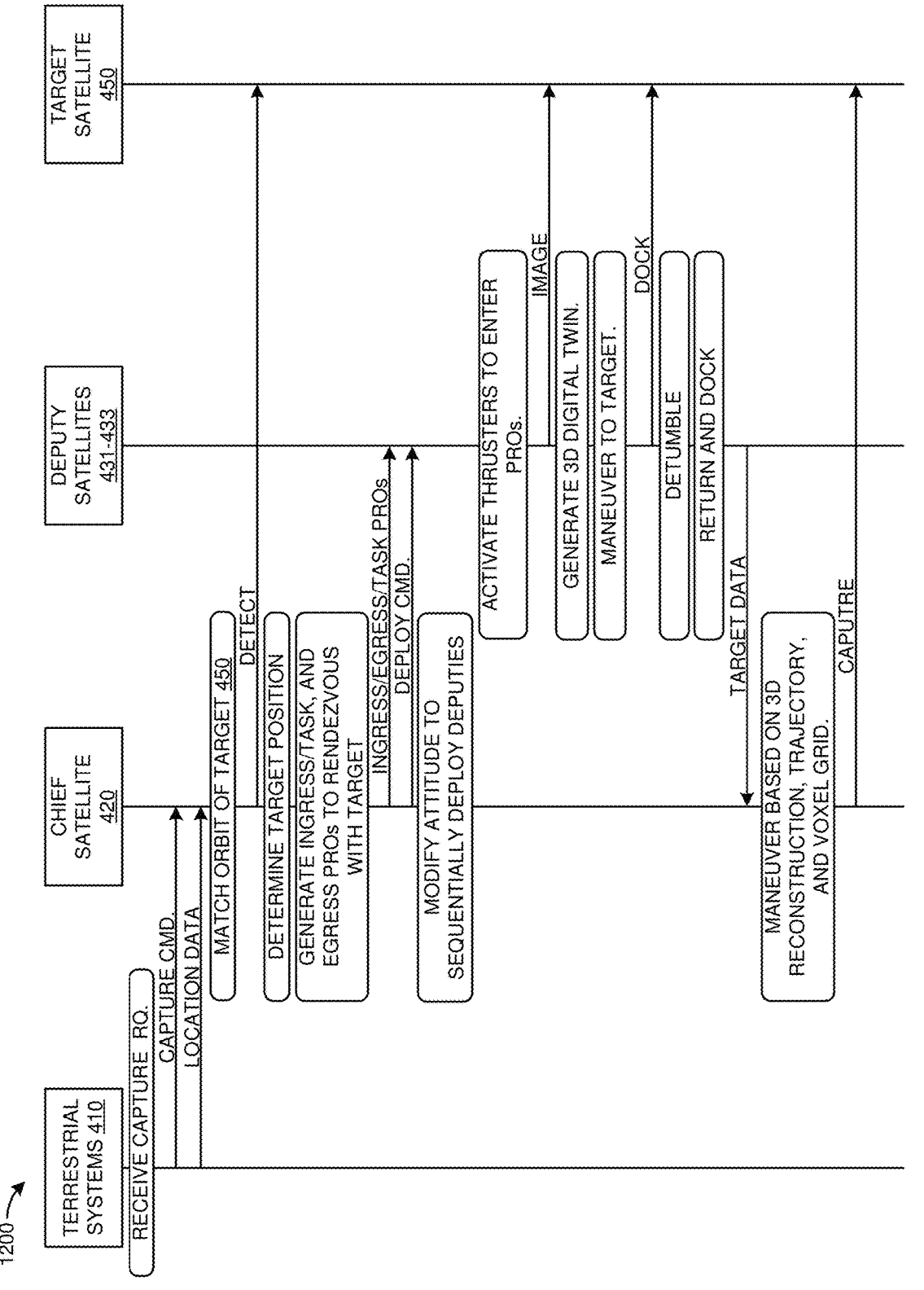
FIG. 12 illustrates an exemplary operation of the multi-agent spacecraft system.

FIG. 12 illustrates process 1200. Process 1200 comprises an exemplary operation of system 401 to capture target satellite 450. Process 1200 comprises an example of process 200 illustrated in FIG. 2 and process 1100 illustrated in FIG. 11, however processes 200 and 1100 may differ. In some examples, terrestrial systems 410 receives a capture request (RQ.) for target satellite 450. For example, target satellite 450 may be representative of an adversary satellite or debris object that requires orbital adjustment. Terrestrial systems 410 wirelessly transfers a capture command (CMD.) and location data characterizing the orbit of target 450 to chief satellite 420. Avionics 421 in chief 420 receives the capture command and target location data and responsively generates a flight plan (e.g., burn times, thruster activations, etc.) to match the orbit of target 450. Avionics 421 drives the propulsion system of chief 420 to implement the flight plan. Chief 420 enters the orbit of target 450 and avionics 421 directs sensor suite 422 of chief 420 to detect target 450. For example, sensor suite 422 may be equipped with image, lidar, and radar sensors to detect target 450. In response to detecting target 450, avionics 421 determines the relative location of target 450 and directs the propulsion system to maneuver chief 450 within one kilometer of target 450.

Avionics 421 hosts a machine learning engine (e.g., an artificial neural network) that comprises algorithms trained to calculate passive and active relative orbits for deputy satellites to rendezvous with a target. Avionics 421 generates feature vectors that represent the position and/or other physical characteristics (e.g., velocity, or rotation) of target 450. When generating the feature vectors, avionics 421 filters the images and input features into a neural network to determine correspondence between images. This allows avionics 421 to determine control processes to accomplish the mission and weight different criteria to prioritize factors like fuel minimization, time minimization, and the like based on the mission constraints. Avionics 421 feeds the feature vectors into the machine learning engine which outputs ingress, task, and egress passive relative orbits for deputy satellites 431-433. In other examples, avionics 421 may instead derive active relative orbits for deputies 431-433 (e.g., to minimize mission time at the expense of increased energy usage). The extent that chief 420 performs 3D reconstruction through feature mapping and correspondence is variable based on mission specifics, and may simply derive passive relative orbits for the deputy vehicles purely through the input location data of the RSO provided be terrestrial systems 410.

Avionics 421 loads the ingress, egress, and task passive relative orbits and deploy commands to the avionics of deputies 431-433 (e.g., avionics 441). In some examples, avionics 421 may load additional mission data like docking commands, deorbit commands, digital twins of the target, and the like. The task passive relative orbits may include data like standoff distances and/or may include precise orbits for deputies around target 450. Avionics 421 direct chief satellite 420's attitude control systems to adjust the attitude of chief 420 to sequentially deploy deputies 420. The attitude adjustments point deputies 431-433 along their respective orbits.

Deputies 431-433 deploy from chief 420. The avionics of deputies 431-433 activates their thrusters based on the flight data received from chief 420 to enter their respective ingress passive relative orbits. Deputies 431-433 travel along their respective orbits towards target satellite 450. When deputies 431-433 reach their task trajectory start points, their avionics activate their thrusters to enter into their task passive relative orbits. The avionics of deputies 431-433 host a machine learning engine that comprises a reinforcement learning algorithm trained to map positional state observations to $\Delta V$ control outputs enabling deputies to maintain a relative orbit around an arbitrary point, in this case target 450. For example, the reinforcement learning algorithm may comprise a fully connected neural network. While in orbit, their avionics drive their respective attitude control systems to orient deputies towards target 450 (e.g., through PID control). The imaging systems of deputies 431-433 view target 450 and provide the resulting images to the avionics. The avionics in deputies 431-433 may drive their respective communications systems to exchange position and trajectory data with each other as well as chief 420. Deputies 431-433 may adjust their relative orbits around target 450 based on the exchanged data to avoid collisions, ensure adequate visual coverage of target 450, and the like.

The avionics in deputies 431-433 host compute vision software to generate a real-time 3D digital twin of target 450 based on images captured through monocular or multi-camera systems. The computer vision software determines the pose of target 450 relative to deputies 431-433 as depicted in the images captured by their imaging systems. After pose determination, the computer vision software inputs sequence of images of target 450 along with the associated pose for each image into 3D surface reconstruction algorithms. The surface reconstruction algorithms perform feature extraction on the image sequence to determine the portions of the images that depict target 450. The features are typically represented as a point cloud that defines the surface of target 450. The surface reconstruction application correlates the features in consecutive images to determine a 3D model of target 450. The resulting output is a 3D surface model with a six degree-of-freedom trajectory of target 450. High fidelity 3D detail may be achieved with neural radiance fields, which optimizes a volumetric representation of a scene based on images from multiple views. Deputies 431-433 use the 3D surface model and trajectory for navigation, inspection, and/or other autonomy tasks of target 450.

The avionics in deputies 431-433 use the digital twin to determine the relative trajectory and roll-rate of target 450 and to generate a voxel grid that defines the surface of target 450 in 3D space. One of deputies 431-433 selects a docking location on target 450 and docks with target 450 based on the voxel grid, roll rate, relative trajectory, digital twin, and/or other data characterizing target 450. For example, deputies 431-433 may generate and input feature vectors that represent the voxel grid, roll rate, relative trajectory, and digital twin into a machine learning engine that comprises algorithms trained to determine relative navigation trajectories for deputies 431-433 to orbit, dock with, and/or perform some other proximity operation. Once attached, the avionics of the docked deputy drives the onboard attitude control system to counteract the tumbling motion of target 450. Once detumbled, the attached deputy detaches from target 450.

The avionics in deputies 431-433 activate their respective propulsion systems to enter into passive relative orbits to return to chief 420. Upon return, deputies 431-433 dock with chief 420 and upload 3D digital twin and/or other data characterizing target 450 to avionics 421. Avionics 421 drives the propulsion system chief 420 to maneuver to target 450 based on the 3D surface reconstruction, relative trajectory, and voxel grid of target 450. Once in close proximity, avionics 421 controls servicing payload 423 to capture target 450. For example, serving payload 423 may comprise robotic arms and avionics 421 may control the robotic arm to dock with target 450 at the docking location identified by deputies 431-433. Once captured, avionics 421 drives the communication system on chief 420 to wirelessly transfer a message to terrestrial systems 410 indicating successful capture.

Figure 13:
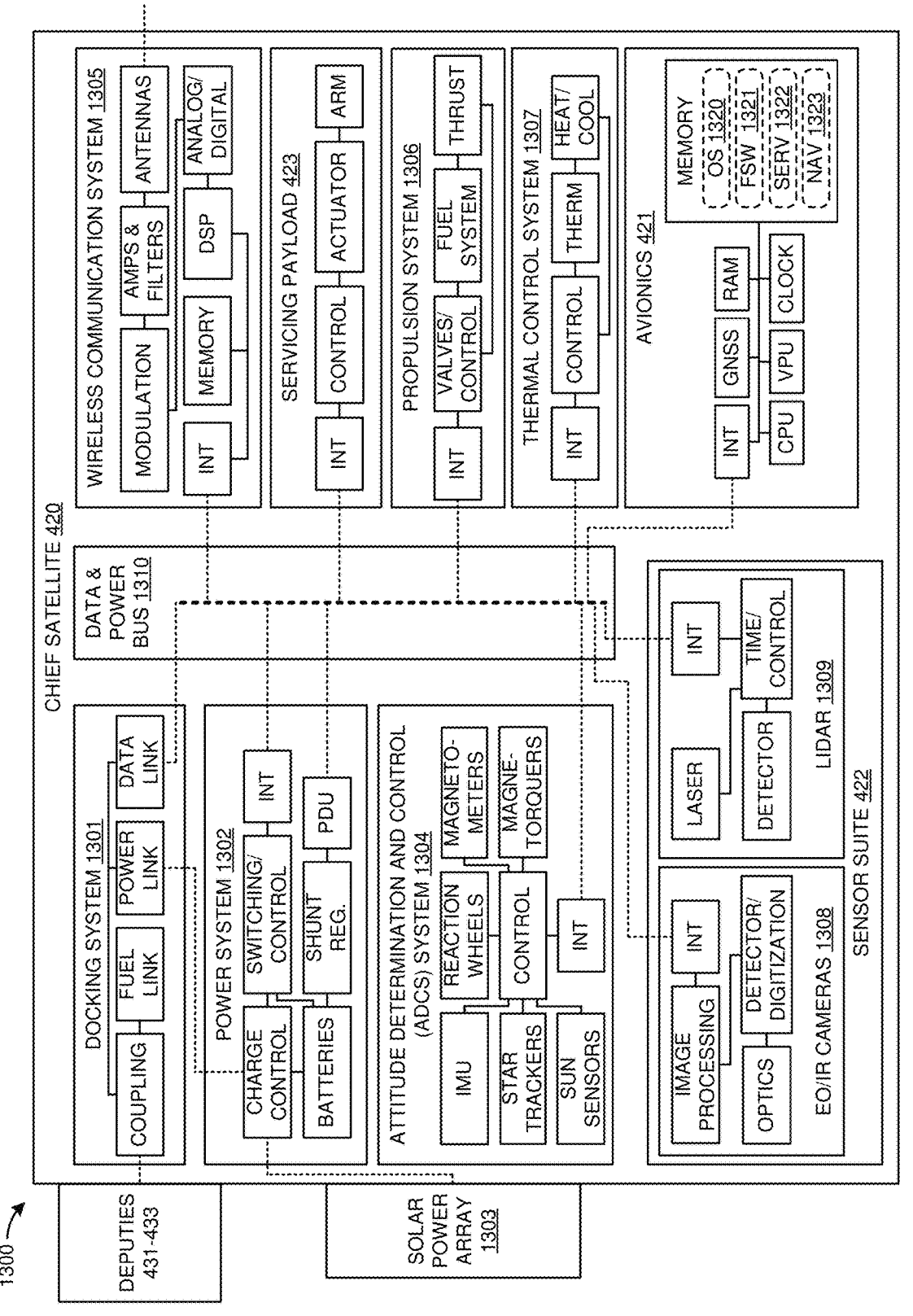
FIG. 13 illustrates an exemplary chief spacecraft.

FIG. 13 comprises view 1300. View 1300 illustrates an example of chief satellite 420 in multi-agent spacecraft system 401. Chief satellite 420 comprises an example of primary spacecraft 111 illustrated in FIG. 1, however spacecraft 111 may differ. Satellite 420 comprises avionics 421, sensor suite 422, servicing payload 423, docking system 1301, power system 1302, solar power array 1303, Attitude Determination and Control System (ADCS) 1304, wireless communication system 1305, propulsion system 1306, thermal control system 1307, and data/power bus 1310. Sensor suite 422 comprise EO/IR cameras 1308 and lidar 1309. In some examples, avionics 421 and sensor suite 422 form a relative navigation and capture system to perform rendezvous and proximity operations in addition to the relative navigation and capture systems formed by the avionics and imaging systems of deputies 431-433. In other examples, satellite 420 may comprise additional or different components than those illustrated in FIG. 13.

Docking system 1301 houses deputy satellites 431-433 when the deputies are attached to chief 420 and provides the fuel, power, and data links between the deputies and chief 420. Docking system 1301 comprises coupling mechanisms and fuel, power, and data links. The coupling comprises electrical interfaces to carry data and power, fuel lines to carry chemical fuel, and mechanical interfaces like male/female sockets to detachably couple deputies 431-433. The power link is coupled to batteries in power system 1302 over a charge controller. The data link is coupled to data and power bus 1310. The fuel link is coupled to the fuel system in propulsion system 1306, however this link is omitted for clarity.

Power system 1302 provides electrical power to the other components in satellite 420 and to deputies 431-433 when they are docked. Power system 1302 comprises a charge controller, batteries, switching/control circuitry, a shunt regulator, a Power Distribution Unit (PDU), and a communication interface (INT) connected over bus circuitry. The charge controller is operatively coupled to solar power array 1303. The communication interface is coupled over data and power buss 1310 to a communication interface in avionics 421. Solar power array 1303 absorbs sunlight and converts the absorbed sunlight to electricity. Solar power array 1303 transfers the electricity to the charge controller in power system 1302. Solar power array 1303 may comprise static solar panels and/or deployable solar panels. The charge controller distributes the received electricity to the batteries. For example, the charge controller may charge batteries that are not at capacity and avoid charging batteries that are at capacity. The switching/control circuitry selects the batteries to use to power the other components of satellite 420. For example, the switching/control circuitry may connect/disconnect the batteries to the power transmission system in satellite 420 based on their charge. The shunt regulator manages the amount of current supplied to the other satellite components. The PDU distributes electrical power to the other satellite components over data/power bus 1310 based on their respective power requirements. For example, data/power bus 1310 may comprise PC/104 form factor circuitry to distribute data and power throughout satellite 420.

ADCS 1304 tracks and controls the spatial orientation (e.g., pitch, yaw, and roll) of satellite 420. ADCS 1304 comprises an Inertial Measurement Unit (IMU), star trackers, sun sensors, reaction wheels, magnetometers, magnetorquers, control circuitry, and a communication interface connected over bus circuitry. The communication interface is coupled to a communication interface in avionics 421 over bus 1310. The IMU maintains the orientation knowledge of satellite 420. The IMU may measure and report the orientation, and acceleration of satellite 420 to the control circuitry. The star trackers and sun sensors comprise imaging systems (e.g., cameras, photocells, etc.) that view the stars and sun to track the orientation (i.e., attitude) of satellite 420. The trackers and sensors report the measured orientation to the control circuitry. The reaction wheels comprise flywheels orientated along the three-spatial axes and electric motors to power the flywheels. The reaction wheels control the orientation of satellite 420. For example, the control circuitry may receive an orientation instruction from avionics 421 to rotate satellite 420 and the control circuitry may increase/decrease the speed of the flywheels to rotate satellite 420 around its center of mass to the desired orientation. The magnetometers measure magnetic fields (e.g., the Earth's magnetic field) for attitude control. The magnetorquers control satellite attitude and perform detumbling and stabilization. The control circuitry reports the measured orientation to avionics 421 and executes orientation commands received from avionics 421.

Wireless communication system 1305 provides wireless communication links between chief satellite 420, deputy satellites 431-433, and terrestrial systems 410. For example, communication system 435 may support wireless links in the S-band frequency range, X-band frequency range, Ka-band frequency range, or some other frequency range or wireless communication protocol. Wireless communication system 1305 comprises antennas, amplifiers and filters, modulation, analog/digital converters, DSP, memory, and a communication interface connected over bus circuitry. For example, the antennas may comprise X-band and S-band antennas. The communication interface is coupled to a communication interface in avionics 421 over bus 1310. The antennas are wirelessly coupled to terrestrial systems 410 and deputy satellites 431-433. The antennas wirelessly exchange signaling (e.g., flight plans, service commands, etc.) with terrestrial systems 410 and/or deputies 431-433. The antennas exchange corresponding electrical signals through duplexers with the amplifiers. The amplifiers boost the electrical signals for the transmission and receipt of communications, and the filters attenuate unwanted energy. Demodulators down-convert the amplified signals from their carrier frequencies and the analog/digital interfaces convert the demodulated analog signals into digital signals. The DSPs process the digital signals and exchange the digital signals with the communication interface. The communication interface exchanges the digital signals with a communication interface in avionics 421 over bus 1310. In some examples, the memory in communication system 1305 is omitted. In some examples, wireless communication system 1305 is replaced by or used in addition with an optical communication system.

Propulsion system 1306 controls the spatial position of satellite 420. Propulsion system 1306 comprises thrusters, a fuel system, valves and control circuitry, and a communication interface connected over fuel lines and bus circuitry. The communication interface is coupled to a communication interface in avionics 421 over bus 1310. The fuel system stores propellant for the thrusters. When satellite 420 needs to modify its orbit (e.g., to match the orbit of target 450), the control circuitry receives a thruster activation command from avionics 421 over the communication interface. The activation command selects one or more of the thrusters and corresponding burn times. The control circuitry opens the valves to supply propellant to the selected thrusters. The thrusters burn the propellant to propel satellite 420. The control circuitry closes the valves when the burn times have elapsed.

Thermal control system 1307 maintains the temperature of satellite 420. Thermal control system 1307 comprises control circuitry, thermometers, heaters/coolers, and a communication interface connected over bus circuitry. The communication interface is coupled to a communication interface in avionics 421 over bus 1310. The thermometers measure the internal temperature of satellite 420 and report the temperature to the control circuitry. When the measured temperature triggers a low-temperature threshold, the control circuitry activates the heaters to increase the temperature of satellite 420. Likewise, when the measured temperature triggers a high-temperature threshold, the control circuitry activates the coolers to decrease the temperature of satellite 420. The control circuitry reports the measured temperature of satellite 420 to avionics 421. In some examples, thermal control system 1307 may be replaced by or used in addition to a passive heating/cooling system (e.g., radiators, insulation, etc.). Satellite 420 may additionally comprise cladding mounted to the exterior of satellite 431 to provide structure, radiation protection, and micrometeor protection. It some examples, the controller in propulsion system 1306 and/or the controller in thermal control system 1307 may be omitted. In such examples, avionics 421 may control systems 1306 and 1307 directly.

Sensor suite 422 is representative of the sensor payload of satellite 420. Although illustrated comprising cameras and lidar, sensor suite may comprise additional sensors (e.g., space radar, Radio Frequency (RF) sensors, x-ray emitters/detectors, etc.) however the additional sensors are omitted for clarity. EO/IR cameras 1308 comprise optics, photon detection and digitization circuitry, image processing circuitry, and a communication interface connected over bus circuitry. The optics comprise components like lenses and mirrors to capture photons that depict RSOs. The photons enter the optics and are passed to the detector/digitation circuitry. The detector/digitization circuitry comprises a Focal Plane Array (FPA) of micrometer size pixels. The pixels are constructed from materials sensitive to photons in the visible, infrared spectrums, and/or ultraviolet spectrum. The detector/digitation circuitry detects the photons and generates a corresponding digital signal that represents the field of view of the camera and passes this signal to the image processing circuitry. The image processing circuitry comprises components like DSPs to translate the digital signal into an image. The communication interface transfers the resulting image to a communication interface in avionics 421 over bus 1310. Lidar 1309 comprises a laser, detector, time/control circuitry, and a communication interface coupled over bus circuitry. The laser emits a beam to a target object and the detector absorbs the reflected laser light. The control circuitry measures the amount of time between beam emission and beam detection. The control circuitry determines the distance to the target object based on the speed of light and the amount of time and indicates the distance to avionics 421 over the communication interface and bus 1310.

Avionics 421 controls the operation of the other components of satellite 420 to track target objects, generate passive/active trajectories, deploy/dock deputies 431-433, communicate with deputies 431-433 and terrestrial systems 410, service targets, capture targets, and/or deorbit targets. Avionics 421 comprises CPU, VPU, RAM, a Global Navigation Satellite System (GNSS) receiver, a clock, a communication interface, and memory connected over bus circuitry. The VPU may be a standalone edge compute system, a GPU cluster, or another type of computing system to manage the processing of machine learning models. The memory stores operating system (OS) 1320, flight software (FSW) 1321, servicing module (SERV) 1322, and relative navigation module (NAV) 1323. The CPU retrieves and executes the software stored by the memory to drive the operation of satellite 420. Operating system 1320 manages the hardware/software resources of avionics 421. Flight software 1321 comprises capabilities for satellite component control, satellite position control, satellite orientation control, flight plan implementation, and inter-satellite interfacing. Servicing module 1322 comprises capabilities for servicing module control, ISAM, target capture, and target deorbiting. Relative navigation module 1323 comprises capabilities for target relative position determining, passive relative orbit determination, active relative orbit determination, and task trajectory planning. For example, relative navigation module 1323 may comprise a deep neural network with reinforcement learning algorithms trained for rendezvous and proximity operations for multi-agent missions.

Figure 14:
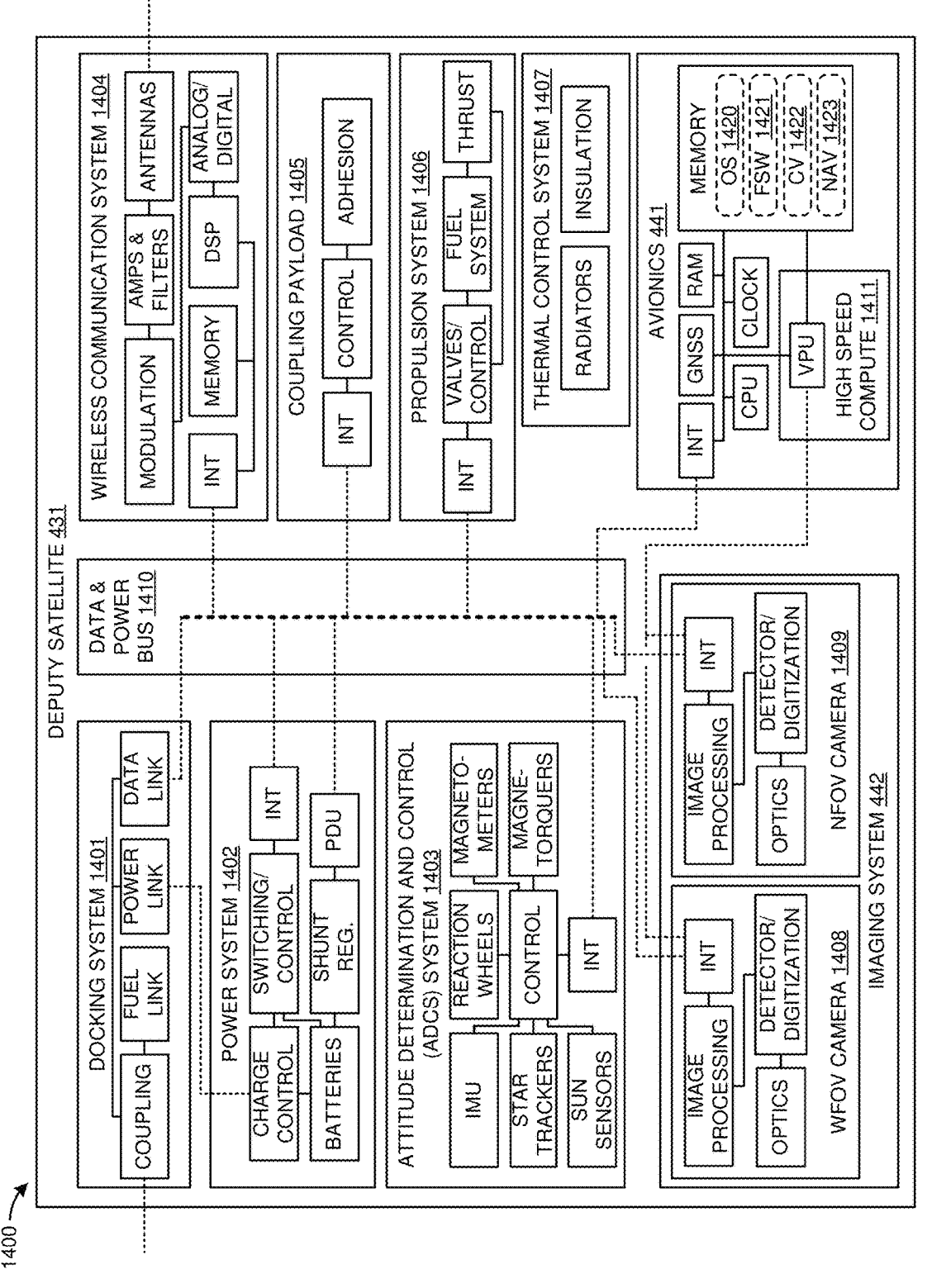
FIG. 14 illustrates an exemplary deputy spacecraft.

FIG. 14 comprises view 1400. View 1400 illustrates an example of deputy satellite 431 in multi-agent spacecraft system 401. Deputy satellites 432 and 433 comprise a similar architecture to deputy 431. Satellite 431 comprises an example of secondary spacecraft 112 illustrated in FIG. 1, however spacecraft 112 may differ. Satellite 431 comprises avionics 441, imaging system 442, docking system 1401, power system 1402, Attitude Determination and Control System (ADCS) 1403, wireless communication system 1404, propulsion system 1406, thermal control system 1407, and data/power bus 1410. Imaging system 442 comprise WFOV camera 1408 and NFOV camera 1409. Avionics 441 comprises high speed compute 1411. High speed compute 1411 may comprise a single low-SWAP edge compute or a scalable GPU cluster depending on the design of deputy satellite 431. Avionics 441 and imaging system 442 form a relative navigation and capture system capable of controlling deputy spacecraft 431 to perform effective and efficient rendezvous and proximity operations. In other examples, satellite 431 may comprise additional or different components than those illustrated in FIG. 14.

Deputy satellite 431 may comprise a variety of formfactors. For example, deputy satellite 431 may comprise 0.7 U cube satellite. The deputy is extremely compact and mounts an NFC-2 High-resolution NFOV Camera and a WFC-3 WFOV camera for navigation/situational awareness. Deputy 431 comprises an on-board computing system (avionics 441) for AI/ML camera processing. In some examples, deputy 431 may comprise a 1.5 U cube satellite. In the 1.5 U configuration, deputy 431 may additionally comprise an IR/VIS illuminator as well as additional equipment like lidar sensors, additional cameras, larger (higher-res) cameras, a larger compute system, batteries, and the like. In some examples deputy 431 may comprise an 8 U payload package. In the 8 U configuration, imaging system 442 comprises a 4 U camera package design similar to the 1 U camera package. The 8 U configuration mounts two NFOV cameras and two WFOV cameras for low resolution imaging at long distances and high-resolution imaging at close distance in both the visible and IR spectrums Docking system 1401 allows deputy 431 to attach to chief 420 to receive fuel and power and provide data links between deputy 431 and chief 420. Docking system 1401 comprises coupling mechanisms and fuel, power, and data links. The coupling comprises electrical interfaces to carry data and power, fuel lines to carry chemical fuel, and mechanical interfaces like male/female sockets to detachably couple to chief 420. The power link is coupled to batteries in power system 1402 over a charge controller. The data link is coupled to data and power bus 1410. The fuel link is coupled to the fuel system in propulsion system 1406, however this link is omitted for clarity.

Power system 1402 provides electrical power to the other components in satellite 431. Power system 1402 comprises a charge controller, batteries, switching/control circuitry, a shunt regulator, a PDU, and a communication interface connected over bus circuitry. The charge controller is operatively coupled to the power link in docking system 1401. The communication interface is coupled over data and power bus 1410 to a communication interface in avionics 441. The charge controller distributes the electricity to the batteries. The switching/control circuitry selects batteries to use to power the other components of satellite 431. The shunt regulator manages the amount of current supplied to the other satellite components. The PDU distributes electrical power to the other satellite components over data/power bus 1410 based on their respective power requirements.

ADCS 1403 tracks and controls the spatial orientation of satellite 431. ADCS 1403 comprises an IMU, star trackers, sun sensors, reaction wheels, magnetometers, magnetorquers, control circuitry, and a communication interface connected over bus circuitry. The communication interface is coupled to a communication interface in avionics 441 over bus 1410. The IMU maintains the orientation of satellite 431. The star trackers and sun sensors comprise imaging systems that view the stars and sun to track the orientation of satellite 431. The reaction wheels comprise flywheels orientated along the three-spatial axes and electric motors to power the flywheels. The reaction wheels control the orientation of satellite 431. The magnetometers measure magnetic fields for attitude sensing. The magnetorquers control satellite attitude and perform detumbling and stabilization. The control circuitry reports the measured orientation to avionics 441 and executes orientation commands received from avionics 441.

Wireless communication system 1404 provides wireless communication links between deputy satellites 431 and chief satellite 420, the other deputy satellites, and optionally with terrestrial systems 410. Wireless communication system 1404 comprises antennas, amplifiers and filters, modulation, analog/digital converters, DSP, memory, and a communication interface connected over bus circuitry. The communication interface is coupled to a communication interface in avionics 441 over bus 1410. The antennas are wirelessly coupled to chief 420, deputy satellites 432 and 433, and optionally with terrestrial systems 410. The antennas wirelessly exchange signaling with satellites 420, 432, and 433 and/or terrestrial systems 410. The antennas exchange corresponding electrical signals through duplexers with the amplifiers. The amplifiers boost the electrical signals, and the filters attenuate unwanted energy. Demodulators down-convert the amplified signals from their carrier frequencies and the analog/digital interfaces convert the demodulated analog signals into digital signals. The DSPs process the digital signals and exchange the digital signals with the transceiver. The communication interface exchanges the digital signals with a communication interface in avionics 441 over bus 1410. In some examples, the memory in communication system 1404 is omitted. In some examples, wireless communication system 1404 is replaced by or used in addition with an optical communication system.

Coupling payload 1405 provides deputy 431 with the capability to dock with RSOs, like satellites, debris, asteroids, and the like. Coupling payload 1405 comprises an adhesion mechanism, control circuitry, and transceivers connected over bus circuitry. The adhesion mechanism may comprise an electrostatic adhesives arm, a Van der Waals force adhesive arm, or a hybrid electrostatic/Van der Waals adhesive arm. When deputy 431 docks with a target RSO, the control circuitry receives an adhere command from avionics 441 over the communication interface. In response, the control circuitry activates the adhesion mechanism to detachably couple deputy 431 to the target RSO. The control circuitry deactivates the adhesion mechanism when prompted by avionics 441.

Propulsion system 1406 controls the spatial position of satellite 431. Propulsion system 1406 comprises thrusters, a fuel system, valves and control circuitry, and a communication interface connected over fuel lines and bus circuitry. The communication interface is coupled to a communication interface in avionics 441 over bus 1410. The fuel system stores propellant for the thrusters. When satellite 431 needs to modify its orbit (e.g., to maintain a relative orbit around target 450), the control circuitry receives a thruster activation command from avionics 441 over the communication interface. The activation command selects ones of the thrusters and corresponding burn times. The control circuitry opens the valves to supply propellant to the selected thrusters. The thrusters burn the propellant to propel satellite 431. The control circuitry closes the valves when the burn times have elapsed.

Thermal control system 1407 maintains the temperature of satellite 431. Thermal control system 1407 is representative of a passive thermal system and comprises radiators and insulation. The radiators shed excess heat to the exterior environment. The insulation is mounted on the exterior of satellite 431 and insulates the internal components of satellite 431. Satellite 431 may additionally comprise cladding mounted to the exterior of satellite 431 to provide structure, radiation protection, and micrometeor protection. In some examples, thermal control system 1407 may be replaced by or used in addition to an active thermal control system (e.g., thermal control system 1307).

Imaging system 442 is representative of the imaging payload of satellite 431. Cameras 1408 and 1409 comprise optics, photon detection and digitization circuitry, image processing circuitry, and a communication interface connected over bus circuitry. The optics comprise components like lenses and mirrors to capture photons that depict RSOs. The photons enter the optics and are passed to the detector/digitation circuitry. The detector/digitization circuitry comprises an FPA of micrometer size pixels. The pixels are constructed from materials sensitive to photons in the visible, infrared spectrums, and/or ultraviolet spectrum. The detector/digitation circuitry detects the photons and generates a corresponding digital signal that represents the field of view of the camera and passes this signal to the image processing circuitry. The image processing circuitry comprises components like DSPs to translate the digital signal into an image. The communication interface transfers the resulting image to a communication interface in avionics 441 over bus 1410 or directly to the VPU in high-speed compute 1411. Although illustrated as comprising two cameras, imaging system 442 may comprise any number of cameras. For example, imaging system 442 may instead comprise a monocular imaging system with a single camera (e.g., NFOV camera 1409). In should be appreciated that the 3D surface reconstruction software stack hosted by avionics 441 may generate 3D surface reconstructions of RSOs using monocular imagery or multi-camera imagery. Moreover, imaging system 442 may comprise other sensors in addition to cameras. For example, imaging system 442 may comprise lidars, radars, x-ray emitters, x-ray detectors, and the like.

In some examples, WFOV camera 1408 is ultra-compact with a 30° FFOV and 17.5 mm image circle. WFOV 1408 camera comprises a custom c-mount 24 mm f/1.6 lens with a 1.5 cm aperture. WFOV 1408 camera has a 32 cm resolution at a range of 1 km and uses an IMX455 image sensor. In some examples, NFOV camera 1409 comprises a 3° FFOV with a 17.5 mm image circle. The optics comprise a custom c-mount 182 mm f/4.4 lens with a 4 cm aperture. NFOV camera 1409 comprises a <2 cm resolution at 1 km and IMX455 image sensor. NFOV camera 1409 comprises a custom focusing mechanism that allows focusing on objects from distant ranges to <0.5 m. NFOV camera 1409 may use remote manual focusing and/or AI-assisted autofocusing.

Avionics 441 controls the operation of the other components of satellite 431 to detect RSOs, determine ingress, egress, and task trajectories, perform relative orbits around arbitrary points, scan RSOs, construct digital twins of RSOs, and interface with other satellites in system 401. Avionics 441 comprises high-speed compute 1411, CPU, RAM, a GNSS receiver, a clock, a communication interface, and memory connected over bus circuitry. High speed compute 1411 comprises a VPU and may include a GPU cluster platform. The memory stores operating system (OS) 1420, flight software (FSW) 1421, computer vision module (CV) 1422, and relative navigation module (NAV) 1423. The CPU retrieves and executes the software stored by the memory to drive the operation of satellite 431. Typically, the CPU in avionics 441 is responsible for executing software for general satellite control (e.g., flight software 1421) while the VPU and GPU cluster in high-speed compute 1411 is responsible for executing software for RSO imaging, RSO surface reconstruction, and relative navigation (e.g., computer vision module 1422 and relative navigation module 1423). In some examples, high speed compute 1411 comprises a separate memory that stores modules 1422 and 1423. The VPU in high-speed compute 1411 comprises a direct link to cameras 1408 and 1409 to reduce image processing latency.

Operating system 1420 manages the hardware/software resources of avionics 441. Flight software 1421 comprises capabilities for satellite component control, satellite position control, satellite orientation control, RSO data reporting, flight plan implementation, and inter-satellite interfacing. Computer vision module 1422 comprises capabilities for RSO 3D reconstruction, point cloud determining, pose extraction, and roll rate determination. Computer vision module 1422 comprises algorithms built on neural networks trained for extraction and 3D surface reconstruction of an RSO at the edge, allowing dynamic determination of vehicle characteristics such as roll rates, moments of inertia, size, weight, and power. Relative navigation module 1423 comprises capabilities for autonomous rendezvous and proximity operations maneuver planning. Relative navigation module 1423 comprises rendezvous proximity operations algorithms that uses a deep neural network trajectory-planning model with a reinforcement learning process designed to autonomously plan an ingress, mission, egress maneuver pipeline for both passive relative orbits and active relative orbits. By pairing the computer vision and relative navigation modules, satellite 431 may respond to evasive actions from the RSO (e.g., satellite 450) at the edge while optimizing fuel, target surface imaging (gaps in data), and time on target allowing response and adaptation to changing conditions. Satellite 431 may monitor and identify RSO evasive actions to build a database for the RSO outlining the spacecraft characteristics such as actuation ability, response time, maneuver capabilities, and the like. Avionics 441 may perform full mission operations at the edge and support any and all follow-on mission capabilities in close proximity or upon capture of the RSO. Avionics 441 may perform fully autonomous rendezvous and proximity operations and like RSO capture to remove "human in the loop" for autonomous operations reducing cognitive load for the operators.

Figure 15:
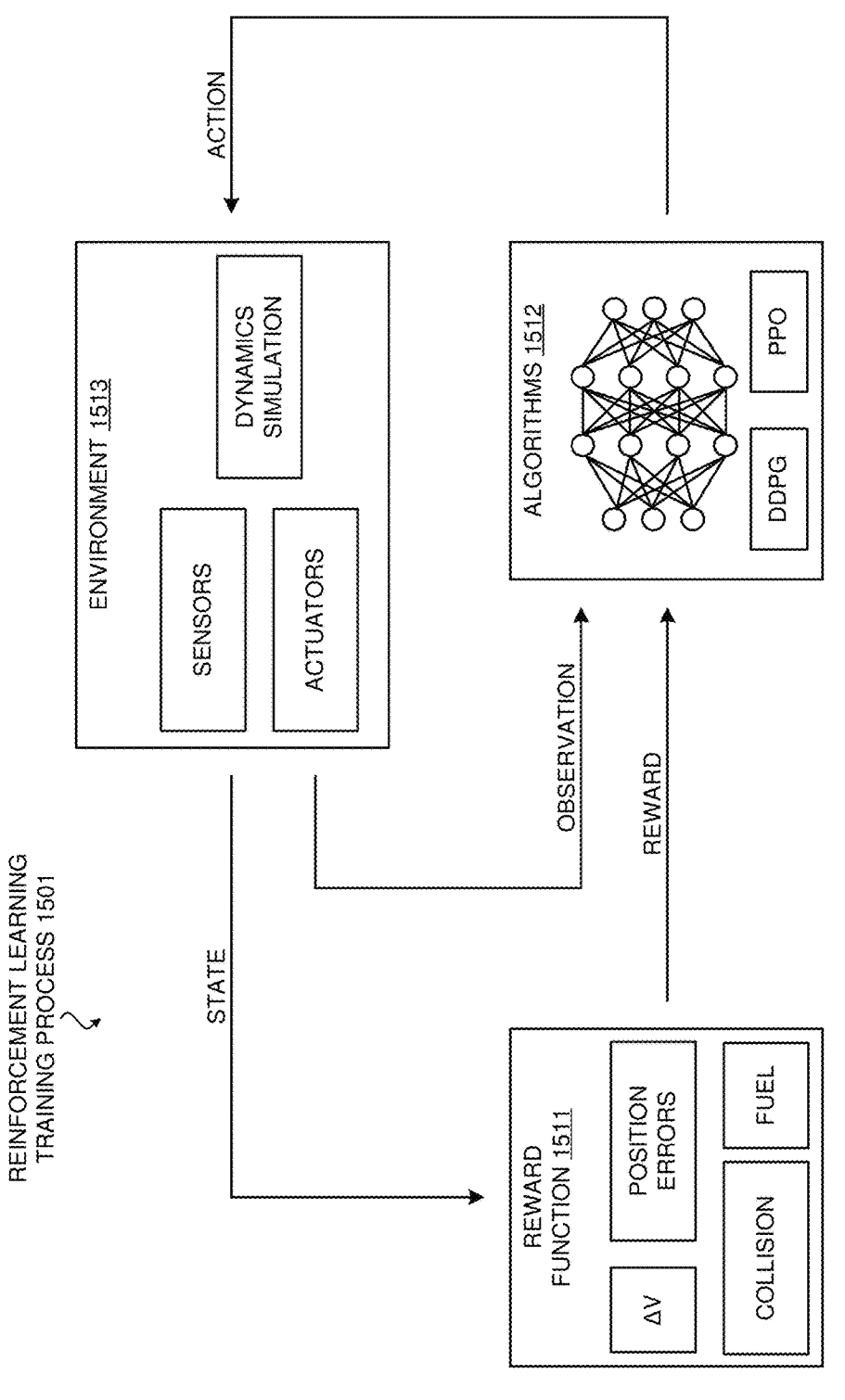
FIG. 15 illustrates an exemplary relative navigation training process.

FIG. 15 comprises view 1500. View 1500 illustrates reinforcement learning training process 1501. Process 1501 is an example of a machine learning training process for relative navigation operations. For example, process 1501 may be implemented by relative navigation modules 1323 and/or 1423 to train the machine learning algorithm to maneuver satellites 420 and 431-433 to perform rendezvous and proximity operations. Process 1501 comprises reward function 1511, algorithms 1512, and environment 1513. Reward function comprises inputs for $\Delta V$, position errors, collision probability, and fuel constraints. Algorithms 1512 comprise deep deterministic policy gradient (DDPG) algorithms, proximal policy optimization (PO) algorithms, and/ or other reinforcement learning machine learning algorithms. Environment 1513 simulates the operation of a spacecraft (e.g., deputy satellite 431) and comprises sensor outputs, actuator outputs, and dynamic simulation models.

Learning-based methods remove the burden of evaluating the dynamics model in the on-board software through off-line learning conducted prior to the mission. In the learning process, the components of environment 1513 take a control action resulting in an updated state (e.g., a change in velocity). This new state is input to reward function 1511 and evaluated, and a reward (or penalty) is issued to algorithms 1512. Based on the reward, the algorithm parameters (often referred to as weights) are updated using the learning policy of the specified algorithm. Through repeated trials, algorithms 1512 learns which set of parameters result in the highest probability of mission success. The structure illustrated in FIG. 15 makes no assumptions about the system being modeled or the objective of the training allowing it to be adapted to a wide variety of problems. The dynamics and vehicle simulation models of environment 1513 may represent any level of complexity. The dynamics and vehicle models may include perturbations including non-spherical Earth effects, atmospheric drag for low-earth orbits, discrete thruster burns, and sensor noise. Reward function 1511 is completely customizable, in addition to minimizing the $\Delta V$ and position errors, the system could be optimized for transfer time, collision avoidance, inspection coverage, or any other mission objective.

The success of the reinforcement learning training process 1501 depends on an appropriate reward structure that will allow the algorithm to discern between actions that produce the desired behaviors and those that work against the desired outcome. By enhancing spacecraft's precision and reliability in executing rendezvous and proximity operation maneuvers, the stack will facilitate more efficient, cost-effective, and safe space missions and revolutionize the field of space exploration, providing a more efficient, cost-effective, and safe approach to complex space missions.

Figure 16:
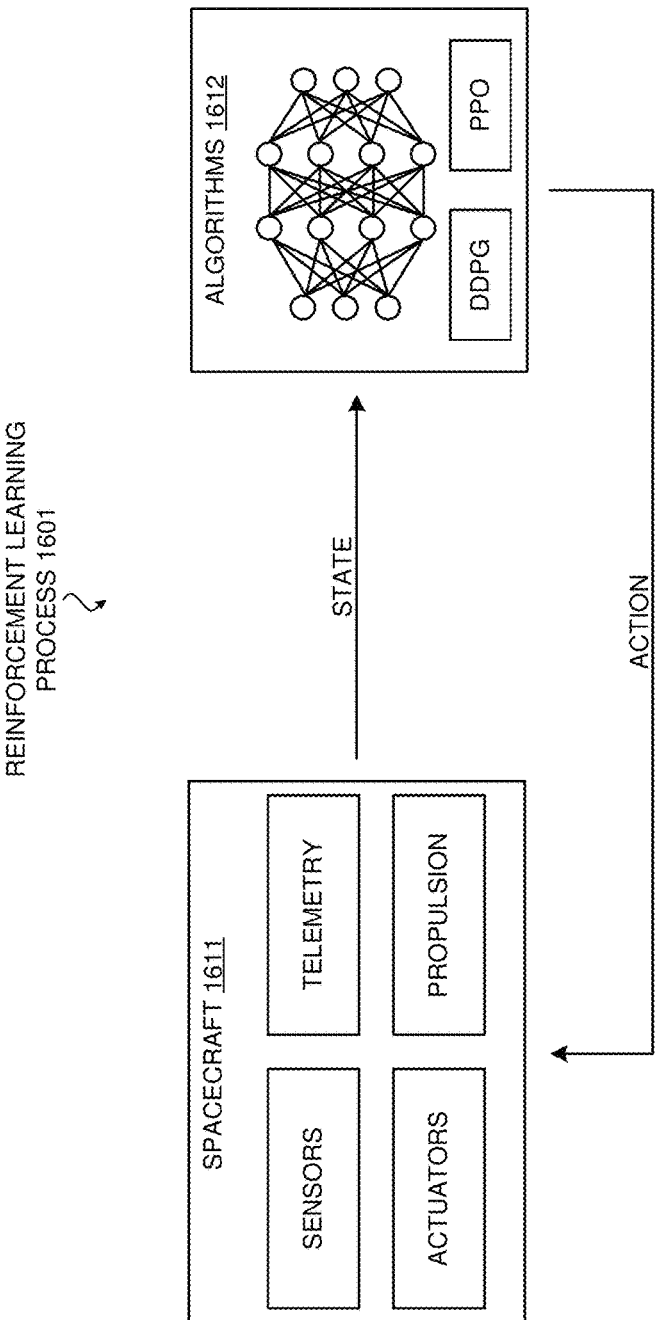
FIG. 16 illustrates an exemplary relative navigation process.

FIG. 16 comprises view 1600. View 1600 illustrates reinforcement learning process 1601. Process 1601 is an example of a trained machine learning process for relative navigation operations. For example, process 1601 may be implemented by relative navigation modules 1323 and/or 1423 to maneuver satellites 420 and 431-433 to perform rendezvous and proximity operations. Process 1601 comprises spacecraft 1611 and algorithms 1612. Spacecraft 1611 comprises sensors, actuators, telemetry, and propulsion. Algorithms 1612 comprise deep deterministic policy gradient algorithms, proximal policy optimization algorithms, and/or other reinforcement learning machine learning algorithms. For example, algorithms 1612 may comprise algorithms 1512 illustrated in FIG. 15 after completion of training process 1501.

In some examples, the sensors and actuators of spacecraft 1611 generate telemetry that indicates the attitude, orbital state, and/or other data describing the motion of spacecraft 1611. The telemetry is fed to algorithms 1612 as the spacecraft's current state. The reinforcement learning framework may determine the control actions (e.g., AVs) required to properly position satellite 1611 for its fly-around task in a predefined passive relative orbit. Satellite 1611 may plan the task trajectories necessary for a group of deputy spacecraft to fly around an RSO of interest that can optimize coverage of an RSO and $\Delta V$. The algorithm input may comprise any parameters used to design the mission. Algorithms 1612 receive the state as input and generate an action (e.g., a maneuver plan) needed to accomplish that mission. Spacecraft 1611 receives the action generated by algorithms 1612 and implements the action using its propulsion systems. Retraining and/or recalculation of the algorithm may be needed when there is significant error in the flight path of the spacecraft, or maneuvering of the target. Any minor perturbations from drag, solar pressure, etc. can be corrected by a PID controller.

Figure 17:
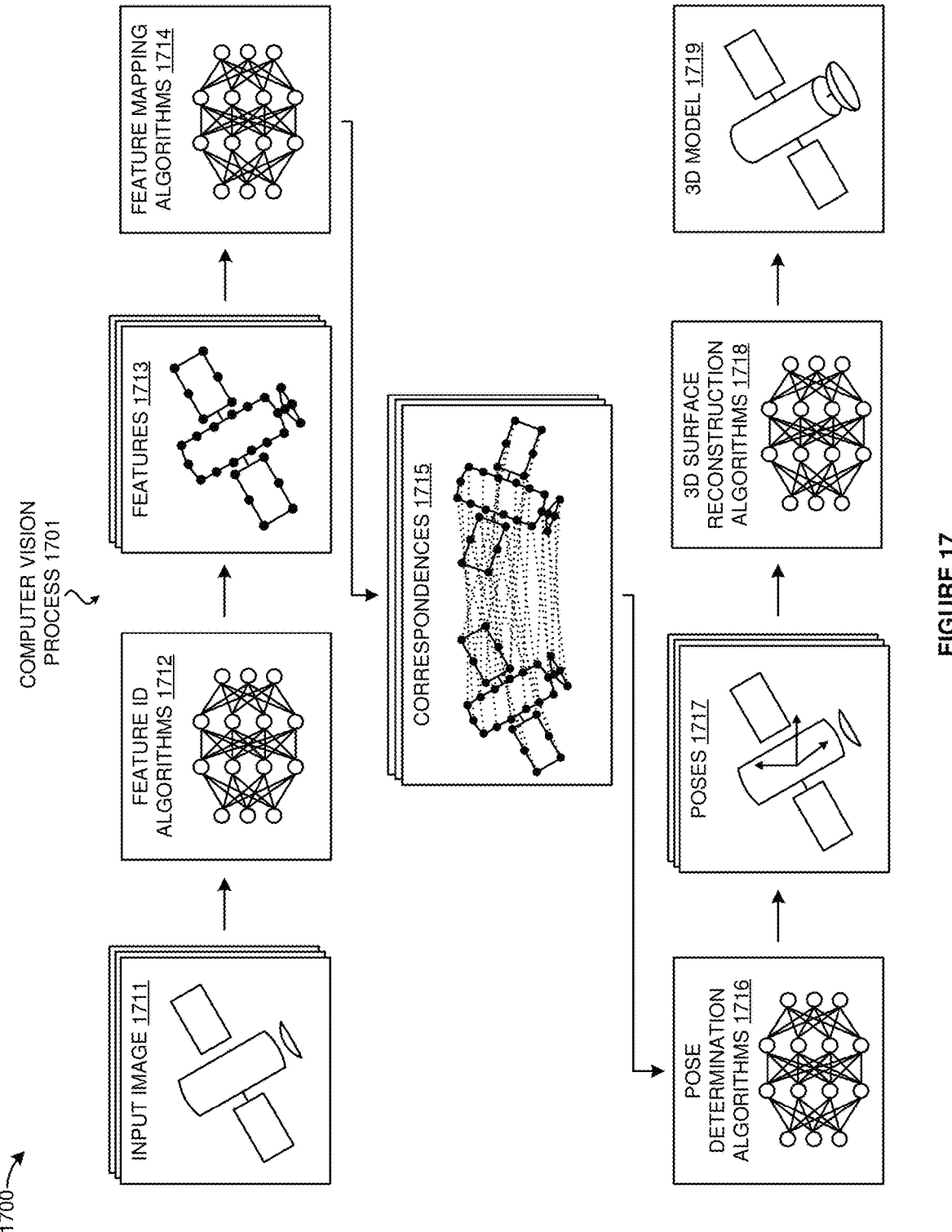
FIG. 17 illustrates an exemplary computer vision process.

FIG. 17 comprises view 1700. View 1700 illustrates computer vision process 1701. Process 1701 is an example of a machine learning process to 3D computer vision. For example, process 1701 may be implemented by computer vision module 1422 to generate 3D surface reconstructions of an RSO for rendezvous and proximity operations. Process 1701 comprises input image 1711, feature identification (ID) algorithms 1712, features 1713, feature mapping algorithms 1714, correspondences 1715, pose determination algorithms 1716, poses 1717, 3D surface reconstruction algorithms 1718, and 3D model 1719. Process 1701 may be used to perform 3D characterization of space systems in real-time using monocular or multi-camera imagery.

In some examples, input images 1711 are fed to feature identification algorithms 1712. Algorithms 1712 are representative of a neural network trained to determine the portions of an image that depict an RSO. For example, feature identification algorithms 1712 may comprise Visual Simultaneous Localization and Mapping (V-SLAM) algorithms, Structure from Motion (SfM) algorithms, and/or another type of feature identification algorithm. Algorithms 1712 identify portions of the images that depict the RSO and annotate the identified portions which are referred to as features 1713. As illustrated in FIG. 17, the features are depicted as black circles.

Features 1713 are provided to feature mapping algorithms 1714. Algorithms 1714 comprise a neural network trained to take two pairs of features 1713 and descriptor vectors and match them together. For example, algorithms 1714 may comprise LightGlue, SuperPoint, ALIKE, and/or another type of feature mapping neural network. Physically, feature matching achieves the goal of determining key points in one image that correspond to another image, allowing physical points on an object to be tracked between frames. Feature matches are output as a vector of index pairs that represent key points in the first feature vector matched to key points in the second feature vector illustrated as correspondence 1715. Feature matching may match key points between two images or may track points across multiple images. To match features across multiple images, a correspondence graph can be used, in which matches between sequential images are added to a graph representing distinct key points that have been tracked between images. Each image can be assigned a unique ID, and a list generated that stores lists of image ID and key point ID pairs.

Correspondences 1715 are input to pose determination algorithms 1716. Pose determination algorithms 1716 determine the orientation of the RSO depicted in input images 1711 relative to the RSO in the previous step. Pose determination algorithms 1716 output poses 1717 which are used as input for 3D surface reconstruction algorithms 1718. Surface reconstruction algorithms 1718 comprise a neural radiance field model trained to reconstruct a dense 3D model from a set of images with given poses. By annotating the images with the estimated pose relative to the object in the previous step, the images can be fed into a neural radiance fields model. Exemplary models include Instant-NGP model. 3D surface reconstruction algorithms generate 3D model 1719 that depicts the imaged RSO in 3D. Model 1719 may comprise a 3D digital twin for use by satellites (e.g., deputies 431-433) to perform rendezvous and proximity operations.

Figure 18:
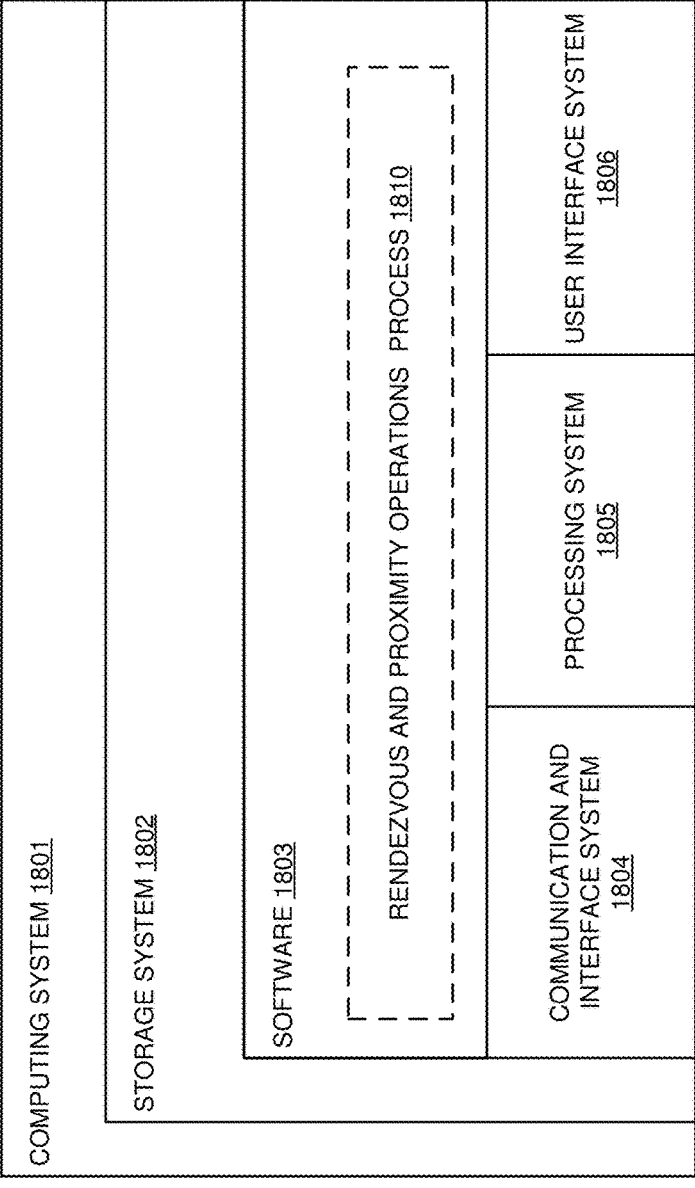
FIG. 18 illustrates an exemplary computing system.

FIG. 18 comprises view 1800. View 1800 illustrates computing system 1801. Computing system 1801 is representative of any system or collection of systems with which the various operational architectures, processes, scenarios, and sequences disclosed herein for controlling and operating multi-agent spacecraft systems. For example, computing system 1801 may be representative of spacecraft 111, spacecraft 112, terrestrial systems 410, avionics 421, avionics 441, and/or any other computing device contemplated herein. Computing system 1801 may be implemented as a single apparatus, system, or device or may be implemented in a distributed manner as multiple apparatuses, systems, or devices. Computing system 1801 includes, but is not limited to, storage system 1802, software 1803, communication interface system 1804, processing system 1805, and user interface system 1806. Processing system 1805 is operatively coupled with storage system 1802, communication interface system 1804, and user interface system 1806.

Processing system 1805 loads and executes software 1803 from storage system 1802. Software 1803 includes and implements rendezvous and proximity operations process 1810, which is representative of any of the rendezvous and proximity operations processes described with respect to the preceding Figures, including but not limited to computer vision operations, relative navigation operations, servicing/capture operations, spacecraft maneuver operations, and spacecraft control operations described with respect to the preceding Figures. For example, rendezvous and proximity operations process 1810 may be representative of process 200 illustrated in FIG. 2, process 1100 illustrated in FIG. 11, process 1200 illustrated in FIG. 12, process 1501 illustrated in FIG. 15, process 1601 illustrated in FIG. 16, and/or process 1701 illustrated in FIG. 17. When executed by processing system 1805 to implement a rendezvous and proximity operations process, software 1803 directs processing system 1805 to operate as described herein for at least the various processes, operational scenarios, and sequences discussed in the foregoing implementations. Computing system 1801 may optionally include additional devices, features, or functionality not discussed for purposes of brevity.

Processing system 1805 may comprise a micro-processor and other circuitry that retrieves and executes software 1803 from storage system 1802. Processing system 1805 may be implemented within a single processing device but may also be distributed across multiple processing devices or subsystems that cooperate in executing program instructions. Processing system 1805 may comprise a scalable GPU Cluster with multiple processing devices. Examples of processing system 1805 include general purpose CPUs, VPUs, GPUs, DSPs, ASICs, FPGAS, analog computing devices, and logic devices, as well as any other type of processing device, combinations, or variations thereof.

Storage system 1802 may comprise any computer readable storage media readable by processing system 1805 and capable of storing software 1803. Storage system 1802 may include volatile, nonvolatile, removable, and/or non-removable media implemented in any method or technology for storage of information, such as computer readable instructions, data structures, program modules, or other data. Examples of storage media include RAM, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1802 may also include computer readable communication media over which at least some of software 1803 may be communicated internally or externally. Storage system 1802 may be implemented as a single storage device but may also be implemented across multiple storage devices or sub-systems co-located or distributed relative to each other. Storage system 1802 may comprise additional elements, such as a controller, capable of communicating with processing system 1805 or possibly other systems.

Software 1803 (including rendezvous and proximity operations process 1810) may be implemented in program instructions and among other functions may, when executed by processing system 1805, direct processing system 1805 to operate as described with respect to the various operational scenarios, sequences, and processes illustrated herein. For example, software 1803 may include program instructions for detecting an RSO, determining passive relative orbits to intercept the RSO, determining task trajectories to orbit the RSO, and generating a 3D digital twin based on images of the RSO as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 1803 may include additional processes, programs, or components, such as operating system software, virtualization software, or other application software. Software 1803 may also comprise firmware or some other form of machine-readable processing instructions executable by processing system 1805.

In general, software 1803 may, when loaded into processing system 1805 and executed, transform a suitable apparatus, system, or device (of which computing system 1801 is representative) overall from a general-purpose computing system into a special-purpose computing system customized to implement a rendezvous and proximity operations process as described herein. Indeed, encoding software 1803 on storage system 1802 may transform the physical structure of storage system 1802. The specific transformation of the physical structure may depend on various factors in different implementations of this description. Examples of such factors may include, but are not limited to, the technology used to implement the storage media of storage system 1802 and whether the computer-storage media are characterized as primary or secondary storage, as well as other factors.

For example, if the computer readable storage media are implemented as semiconductor-based memory, software 1803 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1804 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, lasers, photodetectors, and other communication circuitry. The connections and devices may communicate over communication media to exchange communications with other computing systems or networks of systems, such as metal, glass, air, vacuum, or any other suitable communication media. The aforementioned media, connections, and devices are well known and need not be discussed at length here.

Communication between computing system 1801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

What is claimed is:

1. A multi-agent spacecraft system for rendezvous and proximity operations, the spacecraft system comprising:
a chief spacecraft configured to:
maneuver to an orbit of a Resident Space Object (RSO); and
deploy a deputy spacecraft to rendezvous with the RSO;
the deputy spacecraft configured to:
maneuver to the RSO;
sense the RSO during a rendezvous and proximity operations maneuver;
generate a Three-Dimensional (3D) surface reconstruction of the RSO based on the sensing;
determine a roll rate and a relative trajectory of the RSO based on the sensing; and
return to the chief spacecraft.

2. The system of claim 1 further comprising one or more additional deputy spacecraft; and wherein:
the chief spacecraft configured to:
deploy the deputy spacecraft and the one or more additional deputy spacecraft to rendezvous with the RSO;
the one or more additional deputy spacecraft configured to:
maneuver to the RSO;
sense the RSO during the rendezvous and proximity operations maneuver;
generate additional 3D surface reconstructions of the RSO based on the sensing;
determine the roll rate and the relative trajectory of the RSO based on the sensing; and
return to the chief spacecraft.

3. The system of claim 1 further comprising a machine learning engine that comprises algorithms trained to generate the 3D surface reconstruction and determine the roll rate and the relative trajectory of the RSO based on the sensing; and wherein:
the deputy spacecraft is configured to:
host the machine learning engine;
generate a feature mapping of feature vectors that represent the RSO based on the sensing;
input the feature vectors into the machine learning engine; and
receive a machine learning output that comprises the 3D surface reconstruction, the roll rate, a pose determination, and the trajectory of the RSO.

4. The system of claim 3 wherein:
the machine learning engine comprises additional algorithms trained to generate relative navigation trajectories to orbit the RSO; and
the deputy spacecraft is configured to:
generate additional feature vectors that represent the 3D surface reconstruction, the roll rate, and the trajectory of the RSO;
input the additional feature vectors into the machine learning engine;

receive an additional machine learning output that comprises a relative navigation trajectory to orbit the RSO; and
orbit the RSO based on the relative navigation trajectory.

5. The system of claim 1 further comprising an imaging system mounted to the deputy spacecraft; and wherein:
the deputy spacecraft is configured to utilize the imaging system to image the RSO during the rendezvous and proximity operations maneuver.

6. The system of claim 5 wherein the imaging system comprises a Narrow Field of View Camera (NFOV) for surface reconstruction and a Wide-Field of View Camera (WFOV) for target acquisition and tracking.

7. The system of claim 5 wherein the imaging system comprises a monocular imaging system.

8. The system of claim 1 further comprising a machine learning engine that comprises algorithms trained to determine a trajectory that minimizes a change in velocity for the deputy spacecraft; and
wherein the chief spacecraft is configured to:
host the machine learning engine;
generate feature vectors that represent a position of the RSO relative to the chief spacecraft;
input the feature vectors into the machine learning engine;
receive a machine learning output that comprises the trajectory that minimizes the change in velocity for the deputy spacecraft;
adjust its attitude based on the trajectory; and
load the trajectory onto the deputy spacecraft.

9. The system of claim 8 wherein:
the trajectory comprises at least one of a passive relative orbit or an active relative orbit that comprises an ingress trajectory, a task trajectory, and an egress trajectory; and
the deputy spacecraft is configured to:
maneuver to the RSO based on the ingress trajectory;
orbit the RSO based on the task trajectory; and
return to the chief spacecraft based on the egress trajectory.

10. The system of claim 9 wherein the deputy spacecraft is configured to:
detect an evasive maneuver performed by the RSO;
recalculate the task trajectory based on the evasive maneuver;
orbit the RSO based on the recalculated task trajectory;
return to the chief spacecraft based on the egress trajectory; and
redeploy from the chief spacecraft to perform a follow-on pursuit of the RSO.

11. A method of operating a multi-agent spacecraft system for rendezvous and proximity operations, the method comprising:
a chief spacecraft maneuvering to an orbit of a Resident Space Object (RSO);
the chief spacecraft deploying a deputy spacecraft to rendezvous with the RSO;
the deputy spacecraft maneuvering to the RSO;
the deputy spacecraft sensing the RSO during a rendezvous and proximity operations maneuver;
the deputy spacecraft generating a Three-Dimensional (3D) surface reconstruction of the RSO based on the sensing;
the deputy spacecraft determining a roll rate and a relative trajectory of the RSO based on the sensing; and
the deputy spacecraft returning to the chief spacecraft.

12. The method of claim 11 further comprising:

the chief spacecraft deploying the deputy spacecraft and one or more additional deputy spacecraft to rendezvous with the RSO;

the one or more additional deputy spacecraft maneuvering to the RSO;

the one or more additional deputy spacecraft sensing the RSO during the rendezvous and proximity operations maneuver;

the one or more additional deputy spacecraft generating additional 3D surface reconstructions of the RSO based on the sensing;

the one or more additional deputy spacecraft determining the roll rate and the relative trajectory of the RSO based on the sensing; and the one or more additional deputy spacecraft returning to the chief spacecraft.

13. The method of claim 11 further comprising:

the deputy spacecraft hosting a machine learning engine that comprises algorithms trained to generate the 3D surface reconstruction and determine the roll rate and the relative trajectory of the RSO based on the sensing; and wherein the deputy spacecraft generating the 3D surface reconstruction and determining the roll rate and the relative trajectory of the RSO comprises:

the deputy spacecraft generating a feature mapping of feature vectors that represent the RSO based on the sensing;

the deputy spacecraft inputting the feature vectors into the machine learning engine; and the deputy spacecraft receiving a machine learning output that comprises the 3D surface reconstruction, the roll rate, a pose determination, and the trajectory of the RSO.

14. The method of claim 13 wherein the machine learning engine comprises additional algorithms trained to generate relative navigation trajectories to orbit the RSO; and further comprising:

the deputy spacecraft generating additional feature vectors that represent the 3D surface reconstruction, the roll rate, and the trajectory of the RSO;

the deputy spacecraft inputting the additional feature vectors into the machine learning engine;

the deputy spacecraft receiving an additional machine learning output that comprises a relative navigation trajectory to orbit the RSO; and the deputy spacecraft orbiting the RSO based on the relative navigation trajectory.

15. The method of claim 11 further comprising:

the chief spacecraft hosting scalable compute resources to manage multiple machine learning platforms;

the chief spacecraft utilizing the scalable compute resources to host a machine learning engine that comprises algorithms trained to determine a trajectory that minimizes a change in velocity for the deputy spacecraft;

the chief spacecraft generating feature vectors that represent a position of the RSO relative to chief spacecraft;

the chief spacecraft inputting the feature vectors into the machine learning engine;

the chief spacecraft receiving a machine learning output that comprises the trajectory that minimizes the change in velocity for the deputy spacecraft;

the chief spacecraft adjusting its attitude based on the trajectory; and the chief spacecraft loading the trajectory onto the deputy spacecraft.

16. The method of claim 15 wherein the trajectory comprises at least one of a passive relative orbit or an active relative orbit that comprises an ingress trajectory, a task trajectory, and an egress trajectory; and further comprising:

the deputy spacecraft maneuvering to the RSO based on the ingress trajectory;

the deputy spacecraft orbiting the RSO based on the task trajectory; and the deputy spacecraft returning to the chief spacecraft based on the egress trajectory.

17. The method of claim 11 wherein the deputy spacecraft sensing the RSO during the rendezvous and proximity operations maneuver comprises the deputy spacecraft utilizing an imaging system to image the RSO during the rendezvous and proximity operations maneuver.

18. The method of claim 17 wherein the imaging system comprises a Narrow Field of View Camera (NFOV) for surface reconstruction and a Wide-Field of View Camera (WFOV) for target acquisition and tracking.

19. The method of claim 17 wherein the imaging system comprises a monocular imaging system.

20. One or more non-transitory computer-readable storage media having program instructions stored thereon to operate a deputy spacecraft for rendezvous and proximity operations wherein the program instructions, when executed by a computing system, direct the computing system to perform operations, the operations comprising:

receiving a flight plan that comprises an ingress trajectory, a task trajectory, and an egress trajectory;

in response to deploying from a chief spacecraft, directing a propulsion system to implement the ingress trajectory to rendezvous with a Resident Space Object (RSO);

directing an attitude system to point to the RSO based on the task trajectory;

utilizing an imaging system to image the RSO;

generating feature vectors that represent key points in the images of the RSO;

inputting the feature vectors into a machine learning engine that comprises algorithms trained to generate a Three-Dimensional (3D) surface reconstruction and determine a roll rate and a relative trajectory of the RSO based on the images;

receiving a machine learning output that comprises the 3D surface reconstruction, the roll rate, and the relative trajectory of the RSO; and directing the propulsion system to implement the egress trajectory to return to the chief spacecraft wherein the deputy spacecraft docks with the chief spacecraft upon its return.

* * * * *